United States Patent
Henry et al.

(10) Patent No.: US 11,470,571 B2
(45) Date of Patent: Oct. 11, 2022

(54) ASSIGNING UWB ANCHORS FOR CLIENT RANGING

(71) Applicant: Cisco Technology, Inc., San Jose, CA (US)

(72) Inventors: Jerome Henry, Pittsboro, NC (US); Robert Edgar Barton, Richmond (CA); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/098,735

(22) Filed: Nov. 16, 2020

(65) Prior Publication Data

US 2022/0070816 A1 Mar. 3, 2022

Related U.S. Application Data

(60) Provisional application No. 63/069,886, filed on Aug. 25, 2020.

(51) Int. Cl.
*H04W 64/00* (2009.01)
*H04B 1/69* (2011.01)

(52) U.S. Cl.
CPC .............. *H04W 64/00* (2013.01); *H04B 1/69* (2013.01)

(58) Field of Classification Search
CPC ................................ H04W 64/00; H04B 1/69
See application file for complete search history.

(56) References Cited

U.S. PATENT DOCUMENTS 6,941,110 B2   9/2005   Kloper et al.
8,515,411 B2   8/2013   Sarkar et al.
(Continued)

FOREIGN PATENT DOCUMENTS

CN   109348409 A   2/2019
CN   105430767 B   4/2019
(Continued)

OTHER PUBLICATIONS

Harnesswalla, Taha, "IEEE 802.15.4a—Understanding the protocol and Reducing Multi-User Interference", https://scholar.colorado.edu/concern/graduate_thesis_or_dissertations/pv63g062v, Apr. 9, 2013, 80 pages.

(Continued)

*Primary Examiner* — Sam K Ahn
*Assistant Examiner* — Amneet Singh
(74) *Attorney, Agent, or Firm* — Edell, Shapiro & Finnan, LLC

(57) ABSTRACT

Presented herein are techniques for assigning Ultra-Wideband (UWB) anchors for client ranging. A location server can estimate a coarse location of a mobile device using a localization technique other than a UWB localization technique. The localization technique can involve multiple wireless access points or other radio devices. The location server can define an area around the coarse location to identify a set of candidate anchors for UWB ranging. The set of candidate anchors can be disposed within the area and include at least a subset of the radio devices. The location server can modify the set of candidate anchors to create a modified set of candidate anchors that includes only UWB-enabled devices. The location server can select a primary anchor from the modified set of candidate anchors and send a command to cause a UWB ranging procedure to be initiated between the primary anchor and the mobile device.

20 Claims, 16 Drawing Sheets

(56) References Cited

U.S. PATENT DOCUMENTS

| | | | |
|---|---|---|---|
| 8,559,887 | B2 | 10/2013 | Stager et al. |
| 8,776,221 | B2 | 7/2014 | Rangarajan et al. |
| 9,763,216 | B2 | 9/2017 | Sayeed |
| 9,823,330 | B2 | 11/2017 | Hart et al. |
| 9,949,083 | B1 | 4/2018 | Kirby et al. |
| 9,998,856 | B2 | 6/2018 | Edge |
| 10,064,012 | B1 | 8/2018 | Boston et al. |
| 11,246,010 | B2 | 2/2022 | Mao et al. |
| 11,271,943 | B2 | 3/2022 | Urabe et al. |
| 2005/0085190 | A1 | 4/2005 | Nishikawa |
| 2008/0101296 | A1 | 5/2008 | Palin et al. |
| 2008/0186231 | A1 | 8/2008 | Aljadeff et al. |
| 2009/0311960 | A1 | 12/2009 | Farahani et al. |
| 2010/0271263 | A1* | 10/2010 | Moshfeghi ............ H04W 4/025 342/378 |
| 2013/0138314 | A1 | 5/2013 | Viittala et al. |
| 2014/0152437 | A1 | 6/2014 | Tian et al. |
| 2015/0156637 | A1* | 6/2015 | Li ..................... G01S 1/725 455/454 |
| 2015/0289099 | A1 | 10/2015 | Marano et al. |
| 2015/0378002 | A1 | 12/2015 | Hughes et al. |
| 2016/0178727 | A1 | 6/2016 | Bottazzi |
| 2016/0212579 | A1 | 7/2016 | Duan et al. |
| 2017/0003374 | A1 | 1/2017 | Hehn et al. |
| 2017/0082727 | A1 | 3/2017 | Sendonaris et al. |
| 2017/0123039 | A1 | 5/2017 | Shin et al. |
| 2017/0123045 | A1 | 5/2017 | Shin et al. |
| 2017/0280281 | A1 | 9/2017 | Pandey et al. |
| 2017/0356979 | A1 | 12/2017 | Georgiou et al. |
| 2018/0310272 | A1* | 10/2018 | Younis ..................... G01S 5/10 |
| 2019/0033423 | A1 | 1/2019 | Moslifeghi |
| 2019/0110227 | A1 | 4/2019 | Lepp et al. |
| 2019/0166574 | A1 | 5/2019 | Abou-Rizk et al. |
| 2019/0195981 | A1 | 6/2019 | Ding et al. |
| 2019/0252064 | A1 | 8/2019 | Pipher et al. |
| 2019/0349709 | A1 | 11/2019 | Kim et al. |
| 2019/0387374 | A1 | 12/2019 | Gherardi et al. |
| 2020/0014526 | A1 | 1/2020 | Hammerschmidt et al. |
| 2020/0037113 | A1 | 1/2020 | Tyagi et al. |
| 2020/0041601 | A1 | 2/2020 | Ko et al. |
| 2020/0137676 | A1 | 4/2020 | Yoon et al. |
| 2020/0178036 | A1 | 6/2020 | Edge |
| 2020/0209341 | A1 | 7/2020 | Ylamurto et al. |
| 2020/0228943 | A1 | 7/2020 | Martin et al. |
| 2020/0314681 | A1 | 10/2020 | Kuo et al. |
| 2021/0352434 | A1 | 11/2021 | Harvey et al. |
| 2021/0400441 | A1 | 12/2021 | Burowski et al. |

FOREIGN PATENT DOCUMENTS

| | | | |
|---|---|---|---|
| CN | 110730422 | A | 1/2020 |
| CN | 210042235 | U | 2/2020 |
| WO | 2015078327 | A1 | 6/2015 |
| WO | 2017091792 | A1 | 6/2017 |
| WO | 2019067105 | A1 | 4/2019 |
| WO | 2022025693 | A1 | 2/2022 |

OTHER PUBLICATIONS

Sang, Cung Lian et al., "Numerical and Experimental Evaluation of Error Estimation for Two-Way Ranging Methods", https://www.ncbi.nlm.nih.gov/pmc/articles/PMC6387385/, Feb. 1, 2019, 28 pages.

El-Kamchouchi, Hassan Mohamed et al., "Towards a Precise Direction of Arrival Estimation for Coherent Sources Using ECMUSIC", Journal of Electrical and Electronic Engineering vol. 4, Issue 2, http://article.sciencepublishinggroup.com/html/10.11648.j.jeee.20160402.17.html, Apr. 2016, 9 pages.

Xiaojie Zhao et al., "Does BTLE measure up against WiFi? A comparison of indoor location performance", VDE VERLAG GMBH, Berlin, Offenbach, Germany, ISBN 978-3-8007-3621-8, European Wireless, Jan. 2014, 6 pages.

Qiang Xu et al., "Device Fingerprinting in Wireless Networks: Challenges and Opportunities", IEEE Communications Surveys & Tutorials, vol. 18, No. 1, Draft dated Jan. 8, 2015, 22 pages.

Michael Stocker, BSc, "Design of a Decentralized and Synchronous UWB-based Localization System", Graz University of Technology (TU Graz), May 2018, 111 pages.

"IEEE Standard for Low-Rate Wireless Networks—Amendment 1: Enhanced Ultra Wideband (UWB) Physical Layers (PHYs) and Associated Ranging Techniques," IEEE Standards Association, IEEE Std 802.15.4z™-2020, Aug. 25, 2020, 174 pages.

"IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs)—Amendment 1: Add Alternate PHYs," IEEE, IEEE Std 802.15.4a™-2007, Aug. 31, 2007, 203 pages.

International Search Report and Written Opinion in counterpart International Application No. PCT/US2021/046405, dated Feb. 24, 2022, 14 pages.

Paul Cheong, et al.," An Energy-Efficient Positioning-Enabled MAC Protocol (PMAC) for UWB Sensor Networks," Proceedings of IST mobile and wireless communications summit, 2005, 6 pages.

"802.15.4-2020—IEEE Standard for Low-Rate Wireless Networks," IEEE Xplore, Jul. 23, 2020, 3 pages; https://ieeexplore.ieee.org/document/9144691.

"802.15.6-2012—Part 15.6: Wireless Body Area Networks," IEEE Standard for Local and metropolitan area networks, IEEE Computer Society, Feb. 29, 2012, 271 pages.

* cited by examiner

ASSIGNING UWB ANCHORS FOR CLIENT RANGING

CROSS REFERENCE TO RELATED APPLICATION

This application claims priority to U.S. Provisional Patent Application No. 63/069,886, entitled "Infrastructure Grouping of UWB Anchors for Client Ranging," filed Aug. 25, 2020, the entirety of which is incorporated herein by reference.

TECHNICAL FIELD

The present disclosure relates to network equipment and services.

BACKGROUND

Networking architectures have grown increasingly complex in communications environments, particularly mobile networking environments. In some instances, it is useful to determine a mobile device location within a mobile networking environment. While Institute of Electrical and Electronics Engineers (IEEE) 802.11 (e.g., Wi-Fi@) or Bluetooth@ ranging techniques may be utilized in some cases to determine mobile device location, such technologies typically provide limited location accuracy.

Ultra-Wideband (UWB), as defined in IEEE 802.15.4a and 802.15.4z, may offer improved ranging accuracy over Bluetooth and Wi-Fi. However, UWB ranging techniques are not designed for scale. For example, UWB ranging procedures generally require all UWB anchors and clients to be on the same channel, which can cause channel saturation and/or signal collisions.

DESCRIPTION OF EXAMPLE EMBODIMENTS

Overview

Figure 1:
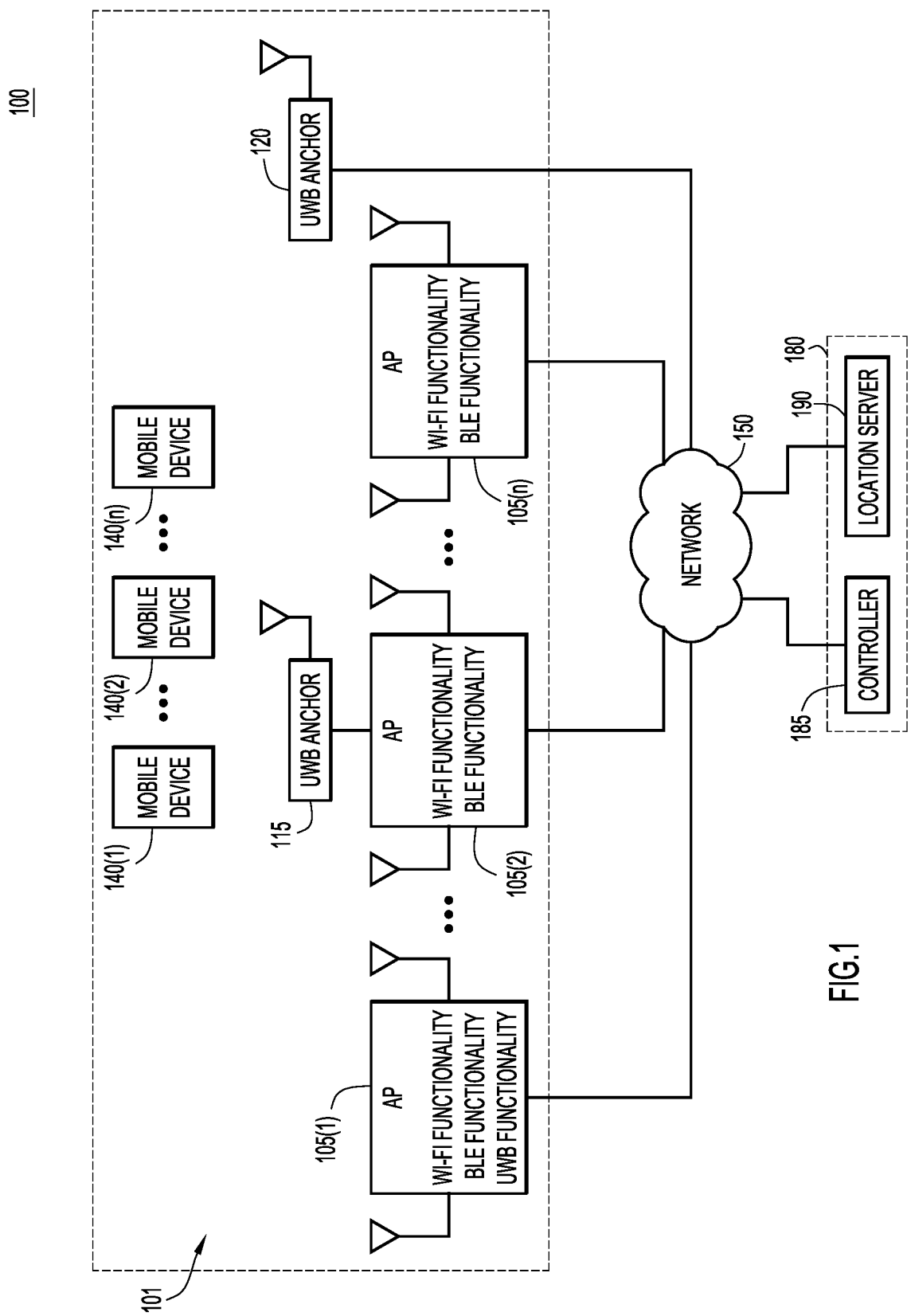
FIG. 1 is a diagram of a system in which techniques for assigning UWB anchors for client ranging may be implemented, according to an example embodiment.

In one embodiment, a location server can be configured to assign UWB anchors for client ranging. The location server can estimate a coarse location of a mobile device using a localization technique other than a UWB localization technique. The localization technique can involve multiple radio devices. The location server can define an area around the coarse location to identify a set of candidate anchors for UWB ranging for the mobile device. The set of candidate anchors can be disposed within the area and include at least a subset of the radio devices. The location server can modify the set of candidate anchors to create a modified set of candidate anchors that includes only UWB-enabled devices. The location server can select a primary anchor from the modified set of candidate anchors and send a command to cause a UWB ranging procedure to be initiated between the primary anchor and the mobile device.

EXAMPLE EMBODIMENTS

Presented herein are techniques for assigning UWB anchors for UWB client ranging. Client ranging can be used, e.g., for detecting and/or tracking a location of a mobile device. Client ranging using a UWB localization technique, i.e., a localization technique involving UWB transmissions, is referred to herein as "UWB ranging." For example, UWB ranging can include time-of-flight (ToF), time-of-arrival (ToA), time-difference-of-arrival (TDoA), received signal strength indicator (RSSI), or other analyses of UWB transmissions. UWB ranging is relatively precise, providing ranging accuracy within about 10 centimeters in line-of-sight (LoS) situations. This level of accuracy is useful for both client-driven and infrastructure-based applications where, for example, Bluetooth Low Energy (BLE) or Wi-Fi-based ranging may provide disappointing results.

However, UWB ranging protocols are not designed for scale. For example, in IEEE 802.15.4a and IEEE 802.15.4z, UWB ranging is specified for one mobile device ranging against only one or a few UWB anchors. Yet, in certain environments, there may be many available UWB anchors, especially when the UWB anchors are installed near access points at ceiling level and in radio frequency (RF) range of one another.

Moreover, UWB protocols generally require all UWB anchors and mobile devices to be on the same channel. Determining which UWB anchor is associated to which mobile device can be important to avoid channel saturation. This is true both for UWB anchors (which may detect transmissions from many mobile devices but may suffer from collisions with mobile devices ranging against neighboring UWB anchors) and for mobile devices (which may encounter channel saturation and be prevented from engaging in the ranging exchanges they need for accurate location).

In an example embodiment, a location server is configured to identify an optimal set of UWB anchors against which a mobile device should range. For example, the location server can be configured to assign an initial set of UWB anchors for client ranging when a mobile device first enters a space serviced by the UWB anchors. The location server also may be configured to dynamically change the UWB anchor assignment if, and as, the mobile device moves within the space.

The space can include a plurality of radio devices, including, e.g., one or more access points. Each of the radio devices is configured to communicate using any radio access technology, such as Wi-Fi, Bluetooth, Bluetooth Low Energy (BLE), IEEE 802.15.4 (low-rate wireless personal area networks (LR-WPANs)), etc. Each of the radio devices may or may not include UWB communication or functionality. The space also may include one or more UWB anchor devices, which include UWB functionality.

The location server can cooperate with the radio devices to estimate a coarse location of the mobile device using a localization technique other than a UWB localization technique, i.e., using a technique that does not involve UWB transmissions. For example, the location server can estimate the coarse location using lateration (e.g., based on RSSI values from the access points) and/or an angle-of-arrival (AoA) technique (e.g., based on TDoA values from the access points). As may be appreciated by a person of ordinary skill in the art, lateration may enable the coarse location to be estimated within, for example, approximately a five to ten meter accuracy of the actual location of the mobile device, while an AoA technique may enable the coarse location to be estimated within about a one to two meter accuracy of the actual location of the mobile device.

The location server can define an area around the coarse location to identify a set of candidate anchors for UWB ranging for the mobile device. For example, the location server can use a convex hull algorithm to define a convex hull spanning all access points or other radio devices within range of one another within an envelope around the coarse location. The set of candidate anchors can include, e.g., access points or other radio devices involved in the coarse location determination, which are disposed within the defined area. The term "candidate anchor" is used herein to refer to any device, which is considered for potential use as a UWB anchor for UWB ranging, even if the device ultimately is not used as a UWB anchor, e.g., because the device does not qualify as a UWB anchor (because it doesn't have UWB capability) or because it is a UWB anchor but nevertheless is not selected for UWB ranging.

The location server can modify the set of candidate anchors to create a modified set of candidate anchors that includes only UWB-enabled devices. For example, the location server can remove from the set of candidate anchors any access points or other radio devices that do not have UWB functionality. In addition, or in the alternative, the location server can add to the set of candidate anchors any UWB anchor devices within the defined area that were not involved in the coarse location determination. For example, the UWB anchor devices may not have been involved in the coarse location determination because they are standalone UWB anchor devices and not integrated with, or attached to, an access point or other radio device, and/or because they do not include a type of communication or functionality that was involved in the coarse location determination.

The location server can select a primary anchor from the modified set of candidate anchors and send a command to instruct the primary anchor to initiate a UWB ranging procedure with the mobile device. For example, the primary anchor can communicate with the mobile device to complete a location exchange, while secondary anchors in RF proximity to the primary anchor can operate as "receive-only anchors," which passively receive UWB transmissions from the mobile device and from the primary anchor but do not send communications to the mobile device. The secondary anchors can, e.g., report the UWB transmissions, and/or information based on the UWB transmissions, to the location server for processing.

Turning now to FIG. 1, an example system 100 for assigning UWB anchors for client ranging within a space 101 can include a plurality of radio devices 105 configured to wirelessly communicate with a plurality of mobile devices 140 via one or more of a variety of different communication technologies. Each of the radio devices 105 can include any access point or other radio or network device configured to facilitate a communication involving one or more mobile devices (such as mobile devices 140). For example, the radio devices 105 can include one or more access points configured to facilitate communication between one or more of the mobile devices 140 and a network 150. Access points are sometimes referred to herein as "APs" or "WLAN access points."

Each of the radio devices 105 can communicate with (i.e., send transmissions to, and/or receive transmission from) one or more of the mobile devices 140 using a relatively short-range wireless local area communication technology, such as (but not limited to) Wi-Fi WLAN, BLE, and/or UWB. For example, radio device 105(1) includes built-in/integrated Wi-Fi functionality for communicating with one or more of the mobile devices 140 over Wi-Fi WLAN, BLE functionality for communicating with one or more of the mobile devices 140 over BLE, and UWB functionality for communicating with one or more of the mobile devices 140 over UWB. Radio device 105(2) includes built-in/integrated Wi-Fi functionality and BLE functionality but not UWB functionality. However, radio device 105(2) is configured to achieve UWB functionality via a separate, peripheral UWB anchor device 115 connected to radio device 105(2). For example, the UWB anchor device 115 can be embodied in a peripheral device connected to radio device 105(2) via a universal serial bus (USB) dongle, a time-synchronized network (TSN) connection, or another connection technology now known or hereinafter developed. Radio device 105(n) also does not include built-in/integrated UWB functionality, and is not connected to any peripheral UWB anchor device. Therefore, radio device 105(n) is not configured to achieve UWB functionality.

Each of the mobile devices 140 can include any mobile device or other object capable of over-the-air RF communications utilizing wireless local area communication technologies such as (but not limited to) Wi-Fi WLAN, BLE, and UWB. Each of the mobile devices 140 also may be capable of over-the-air RF communications utilizing one or more wireless wide area communication technologies such as Third Generation Partnership Project (3GPP) communication technologies (e.g., Fourth Generation (4G)/Long Term Evolution (LTE), Fifth Generation (5G), etc.). For example, each of the mobile devices 140 can include a mobile wireless phone, computer, tablet, smart glasses, Augmented Reality tool, an electronic tag (which may, e.g., be coupled to, or associated with, an electronic or non-electronic object), or another device or object now known or hereinafter developed. A mobile device is sometimes referred to herein as a "client" or "station."

Each of the mobile devices 140 is configured to communicate with one or more of the radio devices 105. For example, each of the mobile devices 140 may include Wi-Fi WLAN functionality for communicating with one or more of the radio devices 105 over Wi-Fi WLAN, BLE functionality for communicating with one or more of the radio devices 105 over BLE, and/or UWB functionality for communicating with one or more of the radio devices 105 over UWB (either directly or via a peripheral UWB anchor device 115).

The mobile devices 140 also may be configured to communicate over UWB with one or more standalone UWB anchor devices 120. A standalone UWB anchor device 120 includes functionality for receiving (and potentially also sending and/or processing) UWB transmissions without being connected to, or integrated with, a radio device 105. Each standalone UWB anchor device 120 also may include other communication capabilities, such as BLE wireless communication capabilities and/or wired communication capabilities, e.g., via a connection to a network (such as network 150) over IEEE 802.11, Ethernet, or another connection mechanism now known or hereinafter developed.

The terms "UWB anchor" and "anchor" are used interchangeably herein to refer to any device or object configured to detect UWB transmissions from one or more mobile devices (e.g., one or more of the mobile devices 140). For example, a UWB anchor can include a standalone UWB anchor device 120, a peripheral UWB anchor device 115 connected to a radio device 105(2), and/or a radio device 105(1) with UWB functionality. As would be appreciated by a person of ordinary skill in the art, while a UWB anchor can include a radio device 105, not all UWB anchors include radio devices 105, and not all radio devices 105 constitute UWB anchors.

It should be appreciated that the number, type, and arrangement of the radio devices 105, mobile devices 140, peripheral anchor devices 115, standalone anchor devices 120, and UWB anchors, and their respective connectivity configurations and capabilities, are illustrative and can vary in alternative example embodiments.

The radio devices 105, peripheral UWB anchor device 115, standalone UWB anchor device 120, and mobile devices 140 are configured to communicate with a control device 180 via a network 150. The network 150 includes any communications medium for transmitting information between two or more computing devices. For example, the network 150 can include a local area network (LAN), wide area network (WAN), virtual private network (VPN), Intranet, Internet, hardwire connections, modem connections, wireless connections, or combinations of one or more these items.

The control device 180 includes one or more computing devices, which include a controller 185 and a location server 190. The controller 185 includes hardware and/or software that is configured to manage operation of the radio devices 105. For example, the controller 185 may be configured to facilitate certain communications involving one or more of the mobile devices 140 through one or more of the radio devices 105. In one form, the controller 185 and the location server 190 may be separate and physically distinct entities. Alternatively, at least certain of the features and/or functionality of the controller 185 and location server 190 may be integrated into a single entity, certain of the features and/or functionality described herein in connection with the controller 185 may be included in, and/or performed by, the location server 190, and/or certain of the features and/or functionality described herein in connection with the location server 190 may be included in, and/or performed by, the controller 185.

The location server 190 includes hardware and/or software that is configured to manage location-related transmissions involving the radio devices 105, peripheral UWB anchor device 115, standalone UWB anchor device 120, and/or mobile devices 140. For example, the location server 190 can be configured to cooperate with the radio devices 105, peripheral UWB anchor device 115, standalone UWB anchor device 120, and/or mobile devices 140 to initiate and complete client ranging procedures within the space 101, e.g., by assigning and/or instructing one or more of the radio devices 105, peripheral UWB anchor device 115, and/or standalone UWB anchor device 120 to complete client ranging procedures with respect to one or more of the mobile devices 140. For example, the location server 190 can be configured so that, when a mobile device 140 enters the space 101, the location server 190 assigns one of the radio devices 105, peripheral UWB anchor device 115, or standalone UWB anchor device 120 as a primary anchor for engaging in a location exchange with the mobile device 140 and other(s) of the radio devices 105, peripheral UWB anchor device 115, and/or standalone UWB anchor device 120 as secondary anchors for passively receiving transmissions from the mobile device 140 and transmissions from the primary UWB anchor for location processing.

The space 101 can include any indoor or outdoor area, such as a home, school, campus, office building, conference center, stadium, or other venue or location or portion thereof. The space 101 may support any density of mobile devices 140. The location server 190 can be configured to assign anchors so that accurate client ranging is enabled for each of the mobile devices 140 regardless of density. For example, as set forth in more detail below, for a particular mobile device 140, the location server 190 can select an optimal set of anchors for client ranging from all available radio devices 105, peripheral UWB anchor devices 115, and/or standalone UWB anchor devices 120 in the space 101.

The location server 190 can be configured to coordinate client ranging procedures involving any of a variety of different localization techniques. In an example embodiment, the location server 190 can be configured to coordinate client ranging procedures involving one or more UWB localization techniques, such as ToF, ToA, TDoA, RSSI, or another technique involving analysis of UWB transmissions, and/or one or more non-UWB localization techniques, such as lateration, AoA, or another technique that does not involve UWB transmissions. For example, the location server 190 can estimate a coarse location for a mobile device 140 using a non-UWB localization technique, select an optimal set of UWB anchor points for UWB ranging based on the coarse location, and use the selected UWB anchor points to determine more precise location information for the mobile device 140 using one or more UWB localization techniques. Thus, the location server may limit UWB ranging to selected UWB anchor points, potentially reducing a likelihood of channel saturation and/or signal collisions relative to a configuration in which UWB ranging involves all available or nearby UWB anchor points.

The location server 190 can include logic for performing one or more location computations based on the localization techniques. For example, the location server 190 can process time, distance, angle, signal strength or other information from one or more of the radio devices 105, peripheral UWB anchor devices 115, standalone UWB anchor devices 120, and/or mobile devices 140 to determine and/or track a location of a particular one of the mobile devices 140. The location server 190 can be configured to return results of that processing to the particular one of the mobile devices 140, e.g., through one or more of the radio devices 105, or to some other entity seeking that location information, if so desired. In addition, or in the alternative, the radio devices 105, peripheral anchor devices 115, standalone anchor devices 120, and/or mobile devices 140 can be configured to perform certain location computations and, potentially, to report results from those computations to the location server 190.

Though illustrated in FIG. 1 as discrete components, and as explained above, it should be appreciated that the controller 185 and location server 190 may be integrated or otherwise reconfigured in any number of different components without departing from the spirit and scope of the present disclosure.

Figure 2:
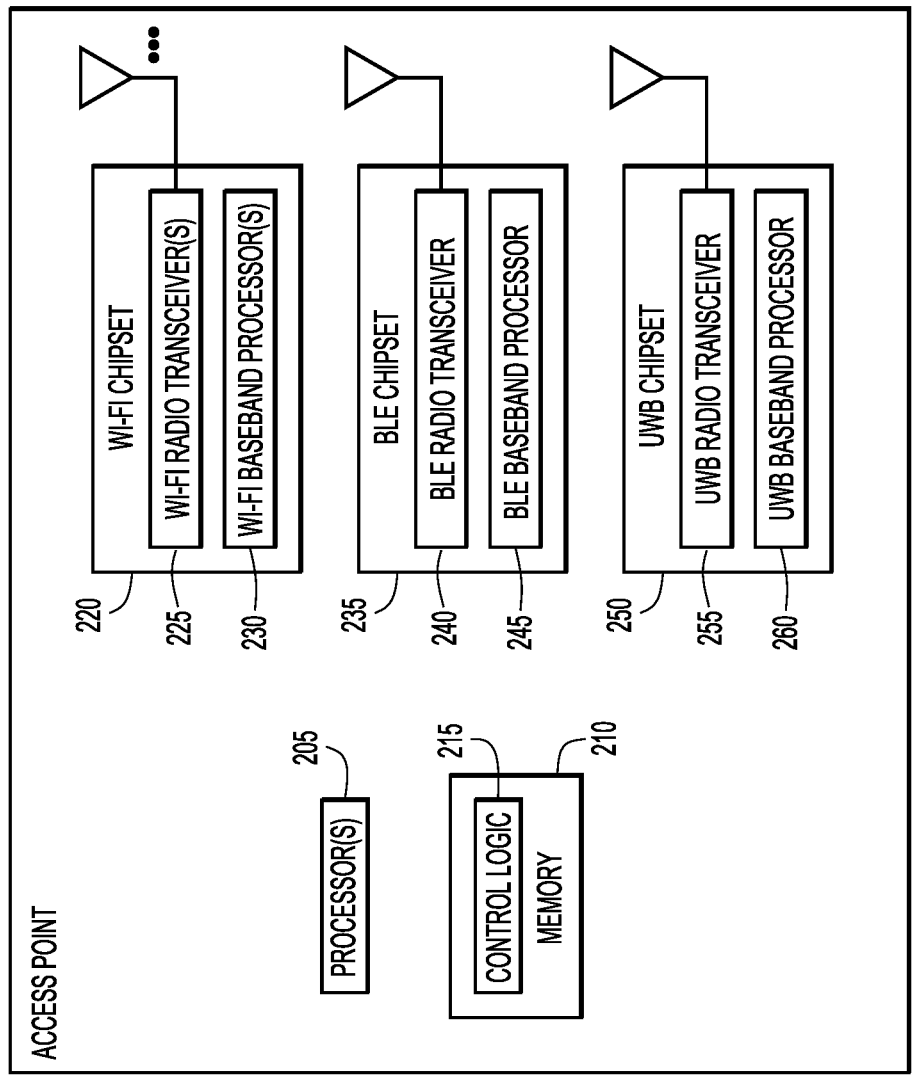
FIG. 2 is a block diagram of an access point configured to participate in the techniques presented herein, according to an example embodiment.

FIG. 2 is a block diagram of an access point 200, according to an example embodiment. The access point 200 includes a Wi-Fi chipset 220 for providing Wi-Fi functionality, a BLE chipset 235 for providing BLE functionality, and a UWB chipset 250 for providing UWB functionality. The Wi-Fi chipset 220 includes one or more Wi-Fi radio transceivers 225 configured to perform Wi-Fi RF transmission and reception, and one or Wi-Fi baseband processors 230 configured to perform Media Access Control (MAC) and physical layer (PHY) modulation/demodulation processing. The BLE chipset 235 includes a BLE radio transceiver 240 configured to perform BLE RF transmission and reception, and a BLE baseband processor 245 configured to perform BLE baseband modulation and demodulation. The UWB chipset 250 includes a UWB radio transceiver 255 configured to perform UWB RF transmission and reception, and a UWB baseband processor 260 configured to perform UWB baseband modulation and demodulation. For example, the Wi-Fi chipset 220, BLE chipset 235, and UWB chipset 250 may be implemented in one or more application-specific integrated circuits (ASICs), field-programmable gate arrays (FPGAs) or other digital logic embodied in one or more integrated circuits.

The access point 200 includes one or more processors 205, which may embody or include one or more microprocessors and/or microcontrollers. In addition, the access point 200 includes a memory 210 that stores control logic 215. The processor(s) 205 are configured to execute instructions of the control logic 215 to execute various control functions for the access point 200.

As would be understood by a person of ordinary skill in the art, the features and functionality of the access point 200 are illustrative and can vary in alternative example embodiments. For example, the access point 200 may include more, less, or different chipsets in alternative example embodiments. In particular, the access point 200 may not include the Wi-Fi chipset 220 if the access point 200 does not include Wi-Fi functionality; the access point 200 may not include the BLE chipset 235 if the access point 200 does not include BLE functionality; and the access point 200 may not include the UWB chipset 250 if the access point 200 does not include UWB functionality. In addition, as would be recognized by a person of ordinary skill in the art, the access point 200 may include one or more additional components, such as a network interface to provide an IEEE 802.11 connection, Ethernet connection, or other connection, which are not depicted in FIG. 2 for purposes of simplicity.

Figure 3:
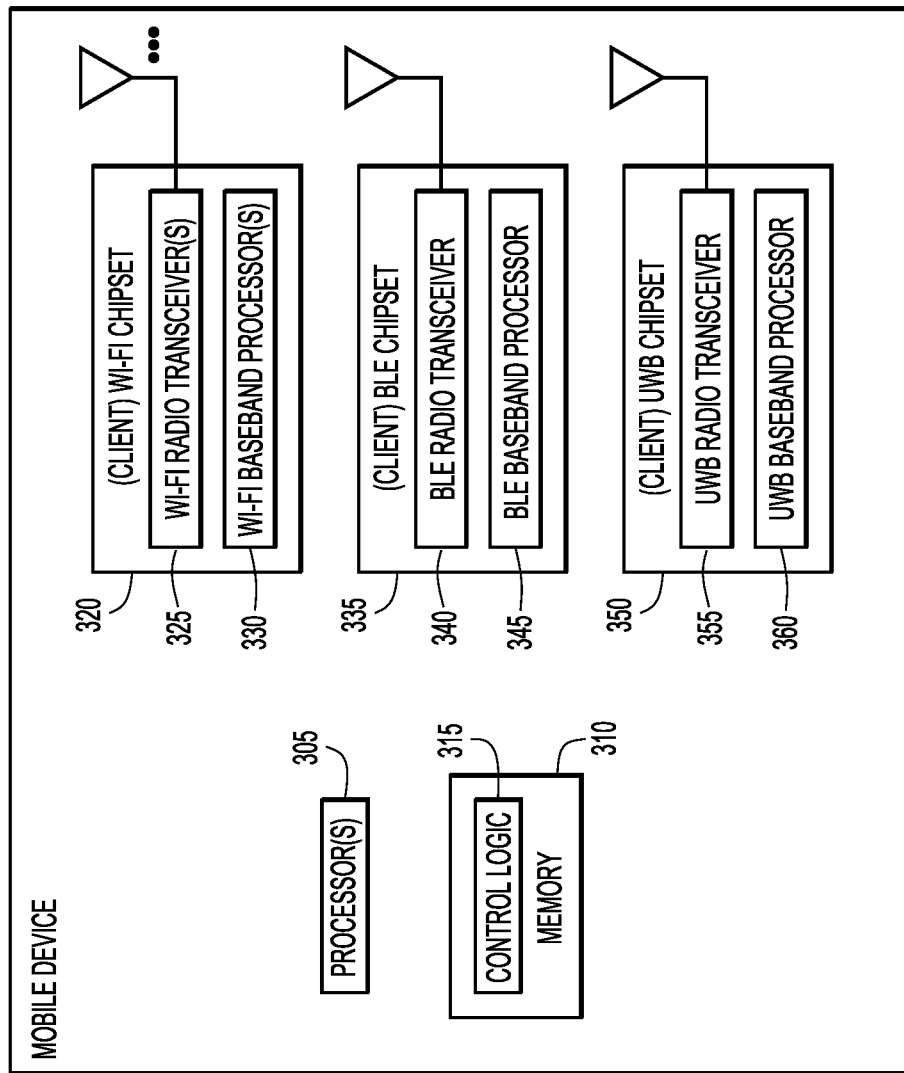
FIG. 3 is a block diagram of a mobile device configured to participate in the techniques presented herein, according to an example embodiment.

FIG. 3 is a block diagram of a mobile device 300, according to an example embodiment. As would be appreciated by a person of ordinary skill in the art, the mobile device 300 includes chipsets similar to the chipsets of an access point, though with configurations for client-side operations and mobile device/battery-powered use cases. In particular, as with the access point 200 described above in connection with FIG. 2, the mobile device 300 includes a Wi-Fi chipset 320 for providing Wi-Fi functionality, a BLE chipset 335 for providing BLE functionality, and a UWB chipset 350 for providing UWB functionality, with the Wi-Fi chipset 320 including one or more Wi-Fi radio transceivers 325 and one or Wi-Fi baseband processors 330, the BLE chipset 335 including a BLE radio transceiver 340 and a BLE baseband processor 345, and the UWB chipset 350 including a UWB radio transceiver 355 and a UWB baseband processor 360. The mobile device 300 also includes one or more processors 305 (e.g., microprocessor(s) and/or microcontroller(s)) and a memory 310 that stores control logic 315.

As would be understood by a person of ordinary skill in the art, the features and functionality of the mobile device 300 are illustrative and can vary in alternative example embodiments. For example, as with the access point 200 depicted in FIG. 2, the mobile device 300 can include more, less, or different components in alternative example embodiments.

Figure 4:
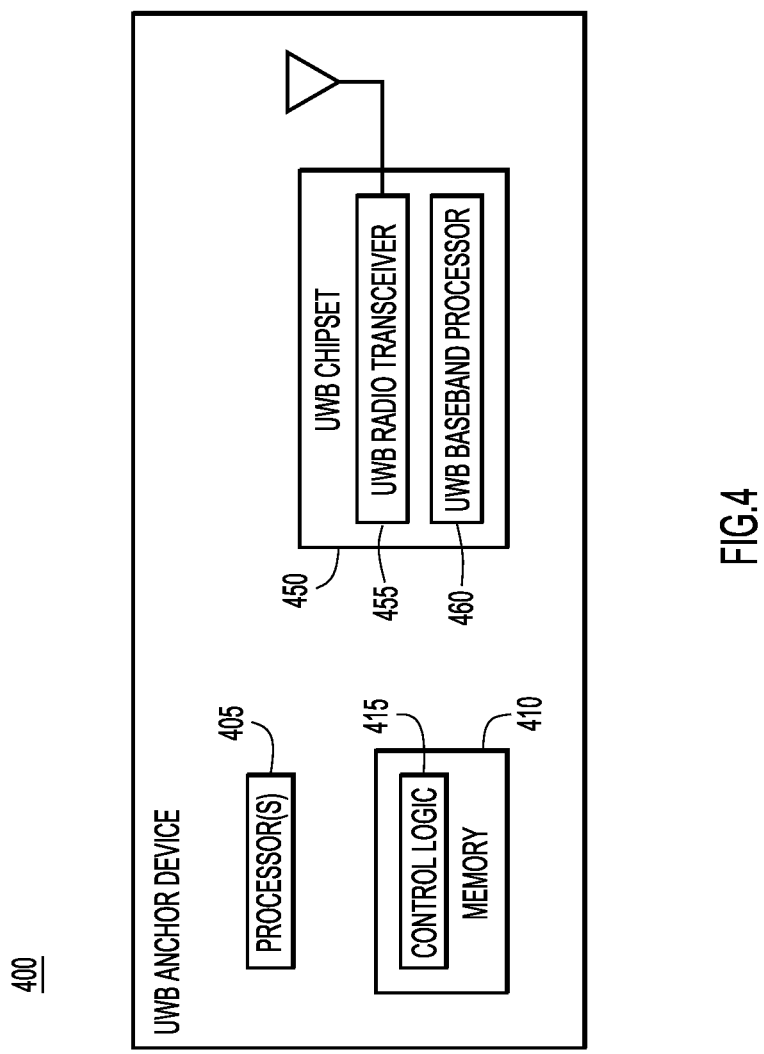
FIG. 4 is a block diagram of a UWB anchor device configured to participate in the techniques presented herein, according to an example embodiment.

FIG. 4 is a block diagram of a UWB anchor device 400, according to an example embodiment. The UWB anchor device 400 can be, for example, a standalone UWB anchor device or a peripheral UWB anchor device. Accordingly, the UWB anchor device 400 may include some, but not all, of the features depicted in FIGS. 2 and 3 for example access point 200 and mobile device 300, respectively. In particular, while the UWB anchor device 400 includes a UWB chipset 450 (with a UWB radio transceiver 455 and UWB baseband processor 460), as well as one or more processors 405 (e.g., microprocessor(s) and/or microcontroller(s)) and a memory 410 that stores control logic 415, the UWB anchor device 400 does not include a Wi-Fi chipset or BLE chipset.

However, the UWB anchor device 400 may include these features, and/or other features not depicted in FIG. 4, in alternative example embodiments. For example, the UWB anchor device 400 can include additional communication capabilities beyond UWB, such as BLE wireless communication capabilities and/or wired communication capabilities, in alternative example embodiments. In addition, as noted above, the UWB anchor device 400 (or functionality thereof) may be integrated in, or connected to, a radio device, such as the access point 200, which may include the same or different components than those depicted in the UWB anchor device 400 of FIG. 4.

Figure 5:
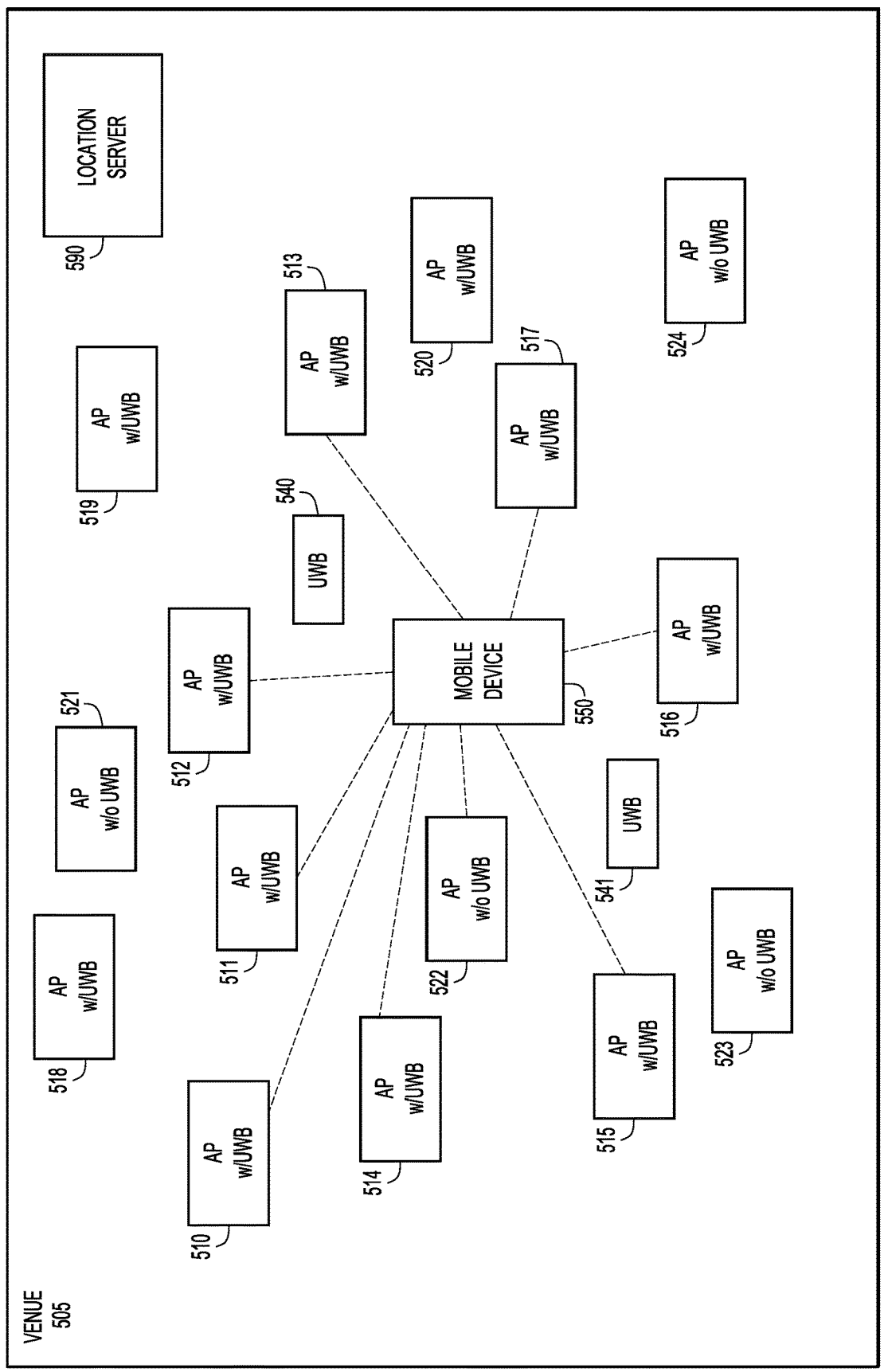
FIGS. 5-11 are diagrams depicting operations for assigning UWB anchors for client ranging, according to an example embodiment.

Turning now to FIGS. 5-10, an example operational flow for assigning UWB anchors for client ranging is now described. Referring first to FIG. 5, in a first stage 500, a mobile device 550 has entered a venue 505. The venue 505 includes any indoor or outdoor area, such as a home, school, campus, office building, conference center, stadium, or other venue or location or portion thereof. The venue 505 includes a plurality of access points 510-524 and a plurality of standalone UWB anchor devices 540 and 541. Certain of the access points 510-524, namely access points 510, 511, 512, 513, 514, 515, 516, 517, 518, 519 and 520 (the "APs w/UWB"), have UWB functionality, while certain other of the access points 510-524, namely access points 521, 522, 523 and 524 (the "APs w/o UWB"), do not have UWB functionality. As described above, each of the APs w/UWB 510-520 can achieve UWB functionality either by including built-in/integrated UWB functionality or by being connected to a peripheral UWB anchor device or other device with UWB functionality. For simplicity, the UWB functionality for each of the APs w/UWB 510-520 is described below with reference to the APs w/UWB 510-520, though it is to be understood that such functionality may be provided by, or involve, a peripheral UWB device or other device connected to the APs 510-520.

A location server 590 is configured to cooperate with the access points 510-524, standalone UWB anchor devices 540 and 541, and/or mobile device 550 to provide client ranging for the mobile device 550. For example, the location server 590 can be configured to cause client ranging procedures to be initiated upon entry of the mobile device 550 into the venue 505, e.g., by assigning one or more of the access points 510-524 and/or standalone UWB anchor devices 540 and 541 as a primary anchor for completing a location exchange with the mobile device 550 and other of the access points 510-524 and/or standalone UWB anchor devices 540 and 541 as secondary anchors for passively receiving transmissions from the mobile device 550 for location processing. The location server 590 also may be configured to dynamically adjust the anchor assignment if, and as, the mobile device 550 moves within the venue 505. Though depicted as being disposed within the venue 505, it should be understood that the location server 590 may be located remote from the venue 505, e.g., in a cloud-based solution, in alternative example embodiments.

Figure 6:
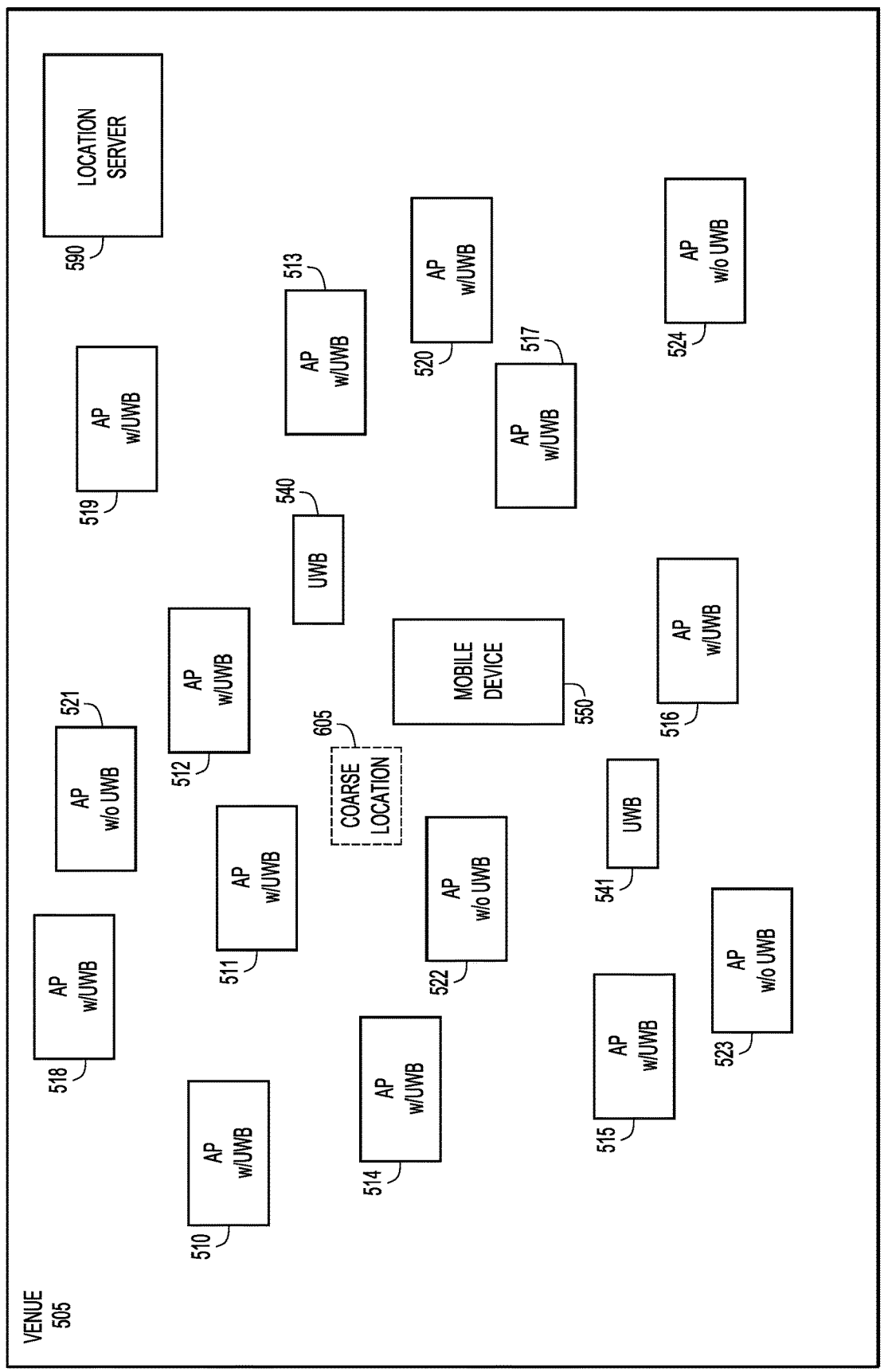

Next, in FIG. 6, in an example embodiment, the location server 590 initiates the client ranging procedure in stage 500 by cooperating with access points 510-517 and 522 to estimate a coarse location 605 of the mobile device 550 using a localization technique other than a UWB technique, i.e., using a technique that does not involve UWB transmissions. For example, the location server 590 can estimate the coarse location 605 using lateration (e.g., based on RSSI values from the access points 510-517 and 522) and/or an AoA technique. The localization technique may involve, e.g., Wi-Fi, BLE, or other non-UWB transmissions from/to the access points 510-517 and 522. It should be understood that the localization technique, and the number, type, and arrangement of devices involved in the localization technique, may vary in alternative example embodiments. For example, though not involved in the localization technique depicted in FIG. 6, one or more UWB anchor devices, such as UWB anchor device 540 and/or UWB anchor device 541, may be involved in the localization technique in alternative example embodiments if, and to the extent that, the UWB anchor devices include Wi-Fi, BLE, or other (non-UWB) functionality that corresponds to a transmission method involved in the localization technique.

As may be appreciated by a person of ordinary skill in the art, lateration may enable the coarse location 605 to be estimated within about a five to ten meter accuracy of the actual location of the mobile device 550, while an AoA technique may enable the coarse location 605 to be estimated within about a one to two meter accuracy of the actual location of the mobile device 550. Thus, in the first stage 500, the location server 590 may determine a general (but not precise) area where the mobile device 550 is located, within an accuracy of about 1 meter to about 7 meters, but perhaps as much as 10 meters.

Figure 7:
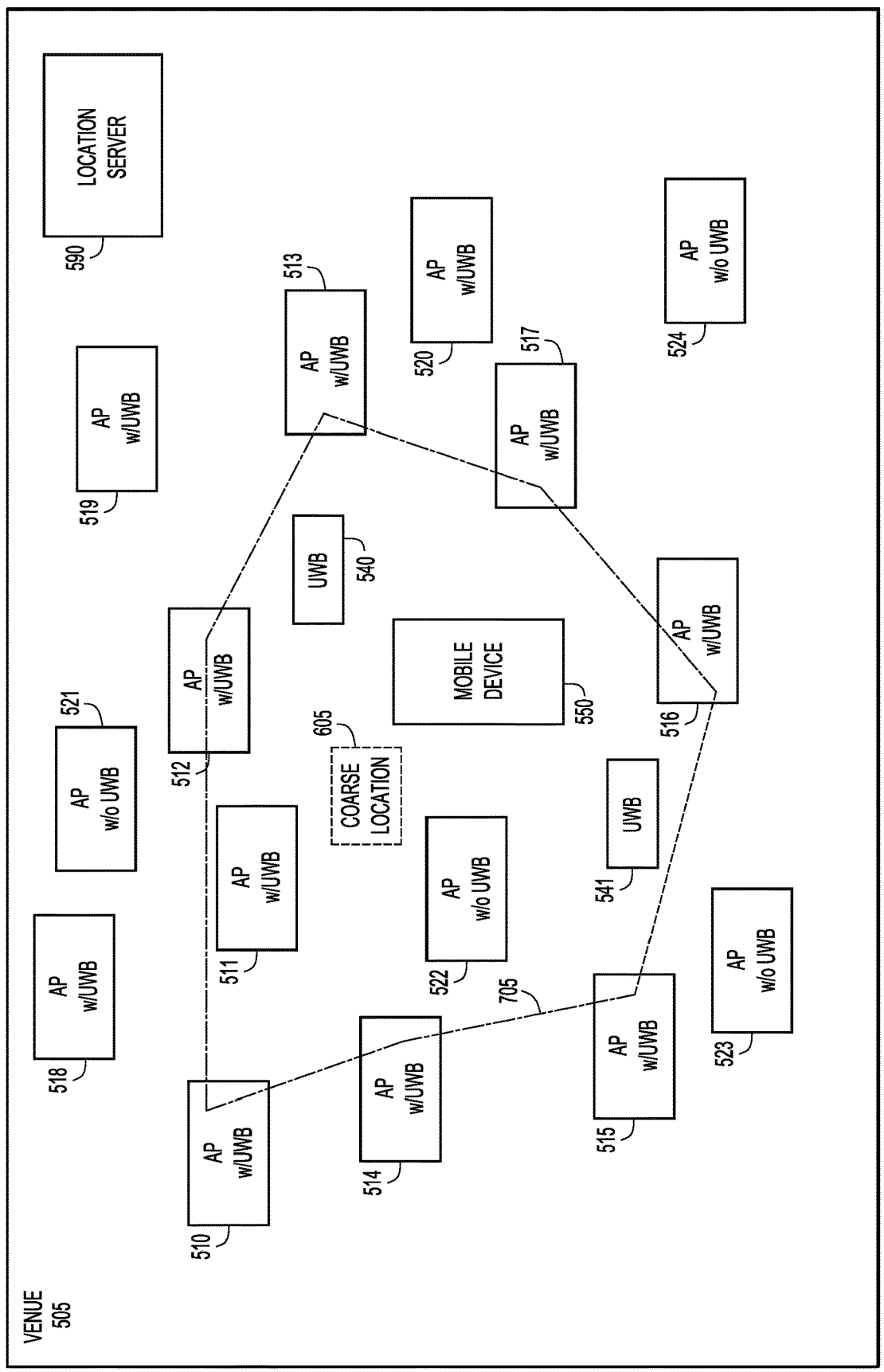

As shown in FIG. 7, in a second stage 700, the location server 590 defines an area 705 around the coarse location 605 to identify a set of candidate anchors for UWB ranging for the mobile device 550. The candidate anchors include all of the access points 510-517 and 522 (and/or other devices) within the area 705, which were involved in the determination of the coarse location 605. For example, the location server 590 may use a convex hull algorithm, such as a Slow Convex Hull or Graham's Scan, to define the area 705 as a convex hull spanning all access points 510-517 and 522 within RF range of one another within an envelope around the coarse location 605. In an example embodiment, the defined area 705 is a closed polygon, with a plurality of line segments connecting each pair of its points (e.g., at one or more of the access points (510 and 512-517) and/or other devices), surrounding the coarse location 605. A size of the area 705 can vary, but in an example embodiment, the area 705 is defined large enough to include at least one candidate anchor in each of four quadrants (viewed as a "clock") around the coarse location 605. It should be appreciated that the size and shape of the area 705, and the number, type, and configuration of the candidate anchors and any other devices therein, are illustrative and should not be construed as being limiting in any way.

Figure 8:
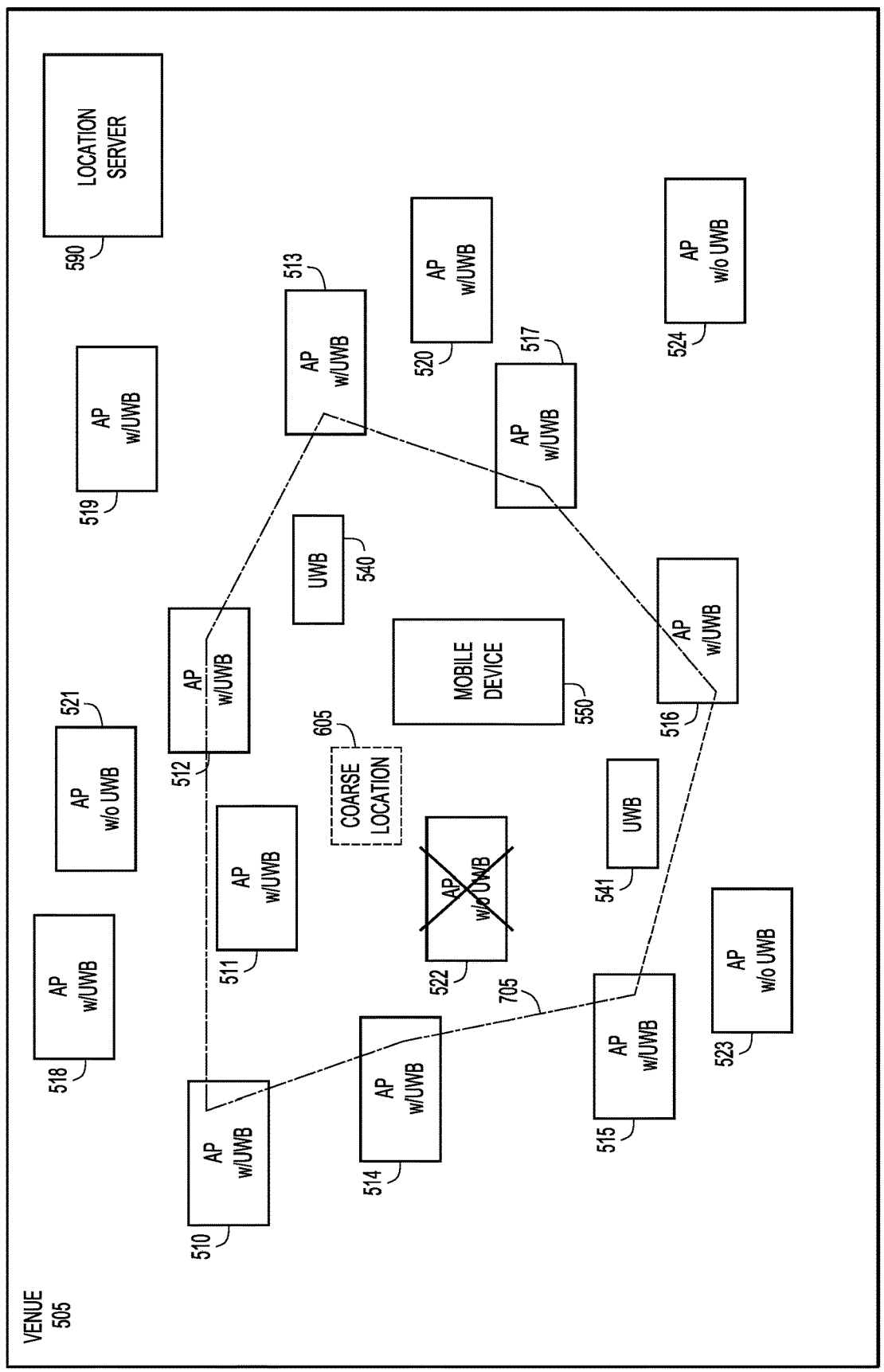

Turning now to FIG. 8, in a third stage 800, the location server 590 determines UWB capabilities (or a lack of UWB capability) for each of the candidate anchors. For example, the location server 590, or a controller or other device in communication with the location server 590, can send one or more communications to the candidate anchors to determine which of the candidate anchors has UWB functionality (whether integrated within the candidate anchor or provided through a peripheral or other device). The location server 590 modifies the set of candidate anchors to create a modified set of candidate anchors that includes only UWB-enabled devices. In particular, the location server 590 removes from the set of candidate anchors any access points, such as access point 522, which do not have UWB functionality. The location server 590 also can add to the set of candidate anchors any devices, such as standalone anchor devices 540 and 541, which are located within the area 705 and have UWB functionality but were not involved in the coarse location determination. For example, these devices may include standalone UWB devices that do not include a type of functionality that was involved in the coarse location determination or otherwise were not included in the coarse location determination.

Next, the location server 590 selects a best possible UWB anchor in the modified set of candidate anchors to be the primary/active anchor for a location exchange with the mobile device 550. The location server 590 also selects secondary anchors for passively receiving transmissions from the mobile device 550 and the primary anchor for location processing. For example, the secondary anchors can act as "observers," observing and reporting on the client ranging exchange with the primary anchor. This information can be used, e.g., to compute an accurate location for the mobile device 550. For example, time of reception measurements made at the secondary anchors can be used, either alone or in combination with information from the primary anchor, to compute distances from the mobile device 550 to the secondary anchors.

Figure 9:
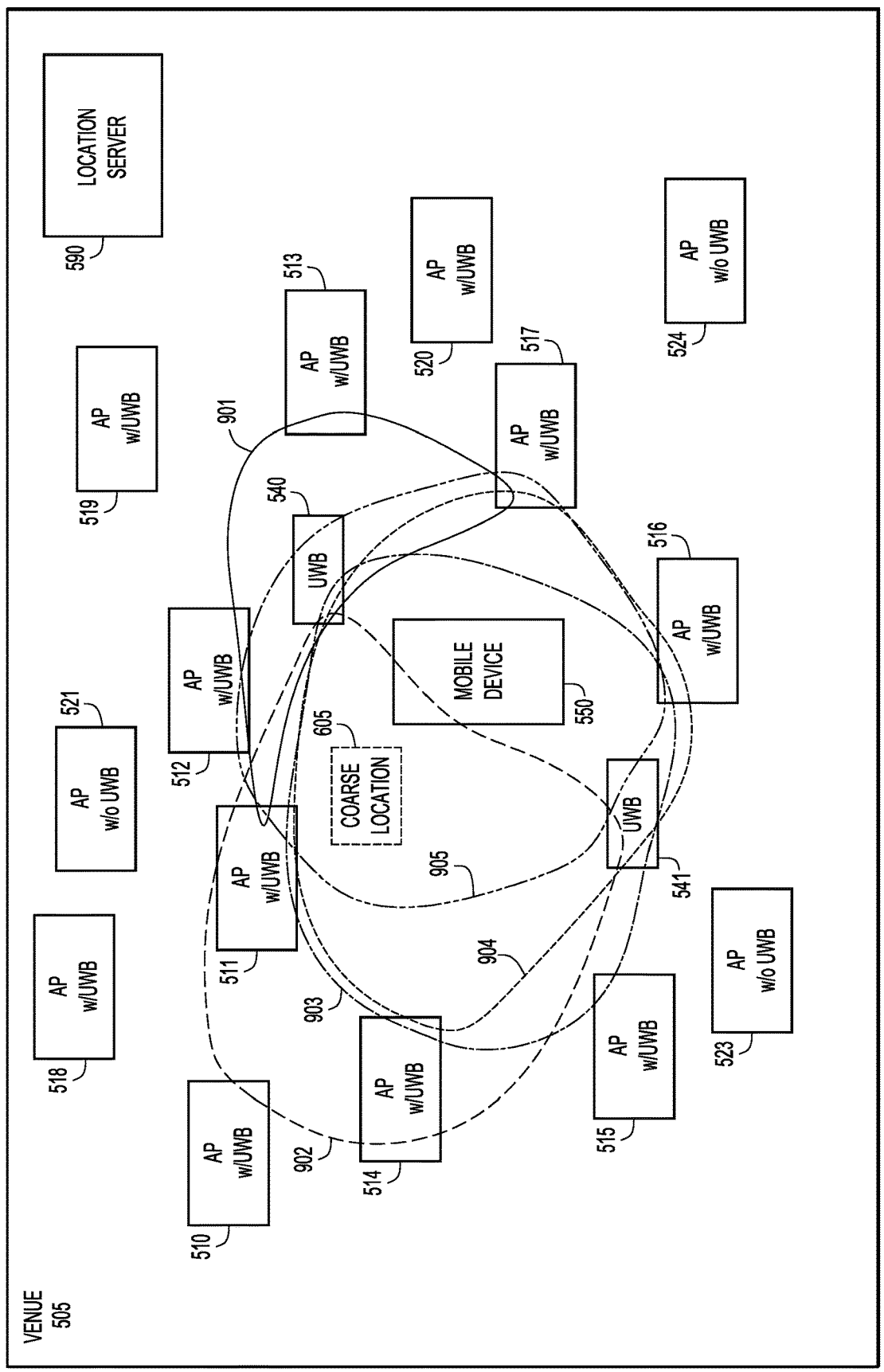
Figure 10:
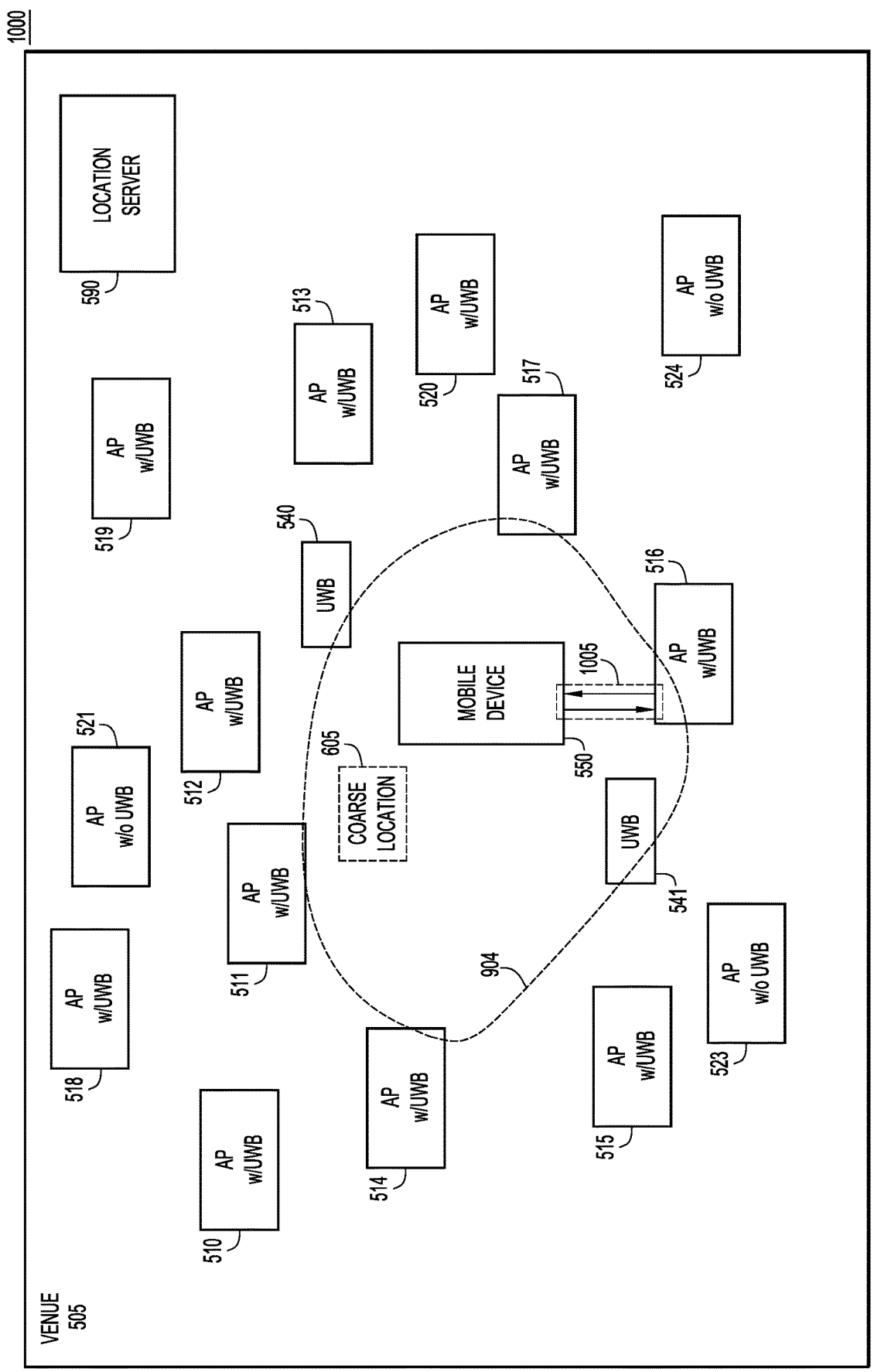
Figure 11:
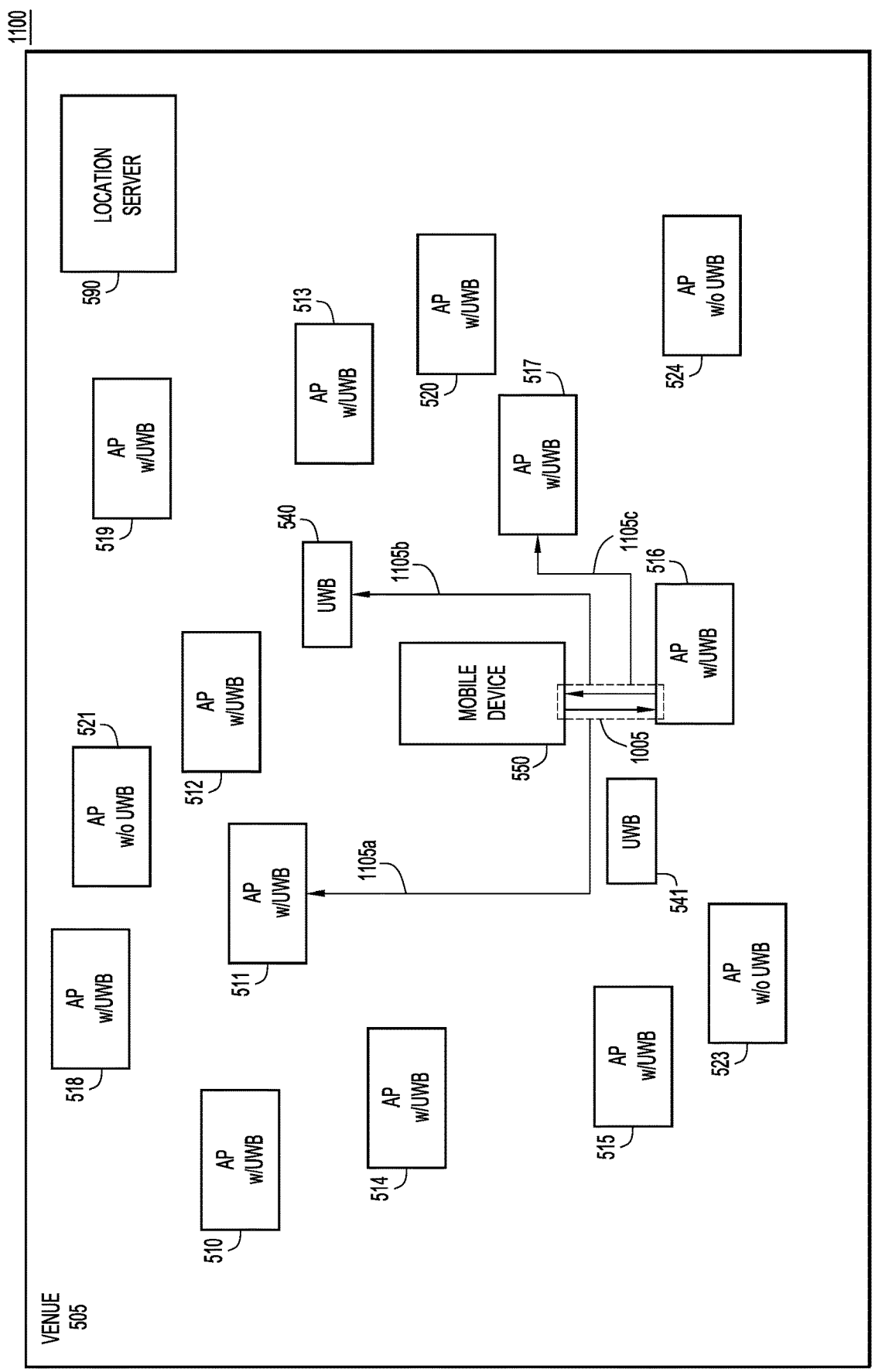

The location server 590 can select the primary and secondary anchors, for example, by forming coherent subgroups of the candidate anchors in stage 900 as shown in FIG. 9, selecting a best subgroup from the coherent subgroups in a stage 1000 shown in FIG. 10, and selecting primary and secondary anchors from the selected subgroup in a stage 1100 as shown in FIG. 11. In stage 900, the location server evaluates, for each candidate anchor in the modified set of candidate anchors, the UWB reachability to each other candidate anchor. As would be appreciated by a person of ordinary skill in the art, a typical Wi-Fi range is larger than a typical UWB range. Therefore, while certain candidate anchors having Wi-Fi capability may be in Wi-Fi range of one another, they may not be in UWB range of one another.

More specifically, as shown in FIG. 9, the location server 590 forms a plurality of subgroups 901-905, with each of the subgroups 901-905 including a subset of the candidate anchors that are all in UWB range of one another. Subgroup 901 includes access point 511, access point 512, access point 513, access point 517, and UWB anchor device 540; subgroup 902 includes access point 510, access point 511, UWB anchor device 540, UWB anchor device 541, and access point 514; subgroup 903 includes access point 514, access point 511, UWB anchor device 540, access point 516, UWB anchor device 541, and access point 515; subgroup 904 includes access point 514, access point 511, UWB anchor device 540, access point 517, access point 516, and UWB anchor device 541; subgroup 905 includes access point 511, access point 512, UWB anchor device 540, access point 517, access point 516, and UWB anchor device 541. For example, the location server 590 can form as many subgroups as possible from the modified set of candidate anchors. It should be appreciated that the number, type, and configuration of the subgroups 901-905, and any devices therein, are illustrative and should not be construed as being limiting in any way.

For each of the subgroups 901-905, the location server 590 calculates a distance to a center of the coarse location 605, e.g., by using one or more location estimation using noisy measurements techniques, such as a mean-square technique, 3-sphere technique, and/or direct Kalman technique. In an example embodiment, the coarse location 605 can include an area, rather than a point, and the center of the coarse location 605 may be computed as a "center" of that area. For example, the location server 590 can use a mean-square reduction computation to sort the subgroups 901-905 by relative distance to the center of the coarse location 605.

A shorter distance may be helpful, for example, to achieve a maximize RF signal with minimal collisions, though distance alone is not a determining factor. For example, there may be walls or other obstacles between a mobile device 550 and an anchor that are relatively close in terms of distance, but for which the RF proximity is not sufficient to use that anchor as a primary anchor for UWB ranging. It can be desirable, for example, to select a primary anchor that maximizes the likelihood that as many other anchors (secondary anchors) as possible within the modified set of candidate anchors will receive the location exchange transmissions from both the mobile device 550 and the primary anchor, and furthermore, so that there is at least one anchor (primary or secondary) in each quadrant around the mobile device 550 in order to compute a reliable triangulation location result.

Starting from a particular one of the subgroups 901-905 with the smallest distance to the center of the coarse location 605, the location server 590 can determine whether any of the subgroups 901-905 includes an anchor that is set as a primary anchor for another mobile device. If a particular one of the subgroups 901-905 includes an anchor that is set as a primary anchor for another mobile device, the location server 590 may select that particular one of the subgroups 901-905 as a best subgroup, and the anchor from that particular one of the subgroup 901-905 as a best primary anchor, for the mobile device 550. For example, selecting as the primary anchor a device that already is serving as a primary anchor for another mobile device may reduce complexity for managing collisions across the overall space of the venue 505, e.g., by preventing a device from serving as both a primary anchor for one or more mobile devices and a secondary anchor for one or more other mobile devices.

If none of the subgroups 901-905 include an anchor that is set as a primary anchor for another mobile device, then the location server 590 can select a one of the subgroups 901-905, which is farthest away from others of the subgroups 901-905 and, within that one of the subgroups 901-905, can select as the primary anchor an anchor that has a smallest neighbor count. Thus, the location server 590 can minimize a chance of collisions between the selected subgroup/anchor and any other group of anchors formed for UWB ranging with another mobile device. For example, in the example depicted in FIGS. 5-11, the location server 590 has selected, in stage 1000 (shown in FIG. 10), subgroup 904 as a best subgroup for the mobile device 550 and access point 516 within that subgroup 905 as the best primary anchor for the mobile device 550.

The location server 590 may select one or more other devices within the subgroup 904, e.g., access point 514, access point 511, UWB anchor device 540, access point 517, and/or UWB anchor device 541, as secondary (receive-only) anchors for UWB ranging for the mobile device 550. For example, location server 590 may select only a closest x number of anchors to include as secondary anchors, e.g., to limit the group of primary and secondary anchors below a total of six or another maximum number of anchors. In addition, or in the alternative, the location server 590 may select as secondary anchors any anchors disposed along a perimeter of the area 705 (shown in FIG. 7). It should be understood that certain of the selected anchors may participate in client ranging, e.g., by receiving ranging exchanges, both for the mobile device 550 and for one or more other mobile devices. As described in more detail below, with reference to FIG. 12, the location server 590 can be configured to maintain a convex hull or other configuration for the anchors while minimizing collisions among the anchors by spreading transmissions as appropriate.

The location server 590 can be configured to send (or cooperate with a controller or other device, which sends) commands to cause the selected anchors to complete a UWB ranging procedure with the mobile device 550. For example, the location server 590 can send (or cooperate with a controller or other device, which sends) a signal to the primary anchor to invoke a mode in which the primary anchor sends to the mobile device 550 a "nudge" message that suggests that the mobile device 550 range with the primary anchor. In addition, or in the alternative, the location server 590 can engage a hybrid mode in which the mobile device 550 is sent a unicast message notifying the mobile device 550 about its primary anchor. The mobile device 550 can then send a "nudge" message that any device can detect, but with a destination address corresponding only to the primary anchor so that only the primary anchor responds. In another embodiment, the mobile device 550 may use a broadcast or multicast address, with only the primary anchor answering and only the secondary anchors considering the message.

Returning to the example depicted in FIGS. 5-11, the location server 590 has selected, in stage 1000, access point 516 as a primary anchor for mobile device 550. The location server 590 causes access point 516 (as shown in FIG. 10) to complete a location exchange 1005 with the mobile device 550. In stage 1100, shown in FIG. 11, selected secondary anchors, namely, access point 511, UWB anchor device 540, and access point 517, passively receive the transmission(s) that the mobile device 550 sends to the access point 516 (as the primary anchor) and the transmission that the access point 516 (as the primary anchor) sends to the mobile device 550, as shown at 1105a-1105c for the mobile device 550.

In an example embodiment, the location server 590 can be further configured to evaluate whether a selected primary anchor is in range of another primary anchor (for another mobile device). If so, the location server 590 can allocate half the UWB slots to each of the primary anchors. Then, the selected primary anchor can send a unicast (or multicast if multiple mobile devices are in the zone) Time-Division Multiple Access (TDMA) trigger to the mobile device 550, allocating transmission slots to the mobile device 550.

Figure 12:
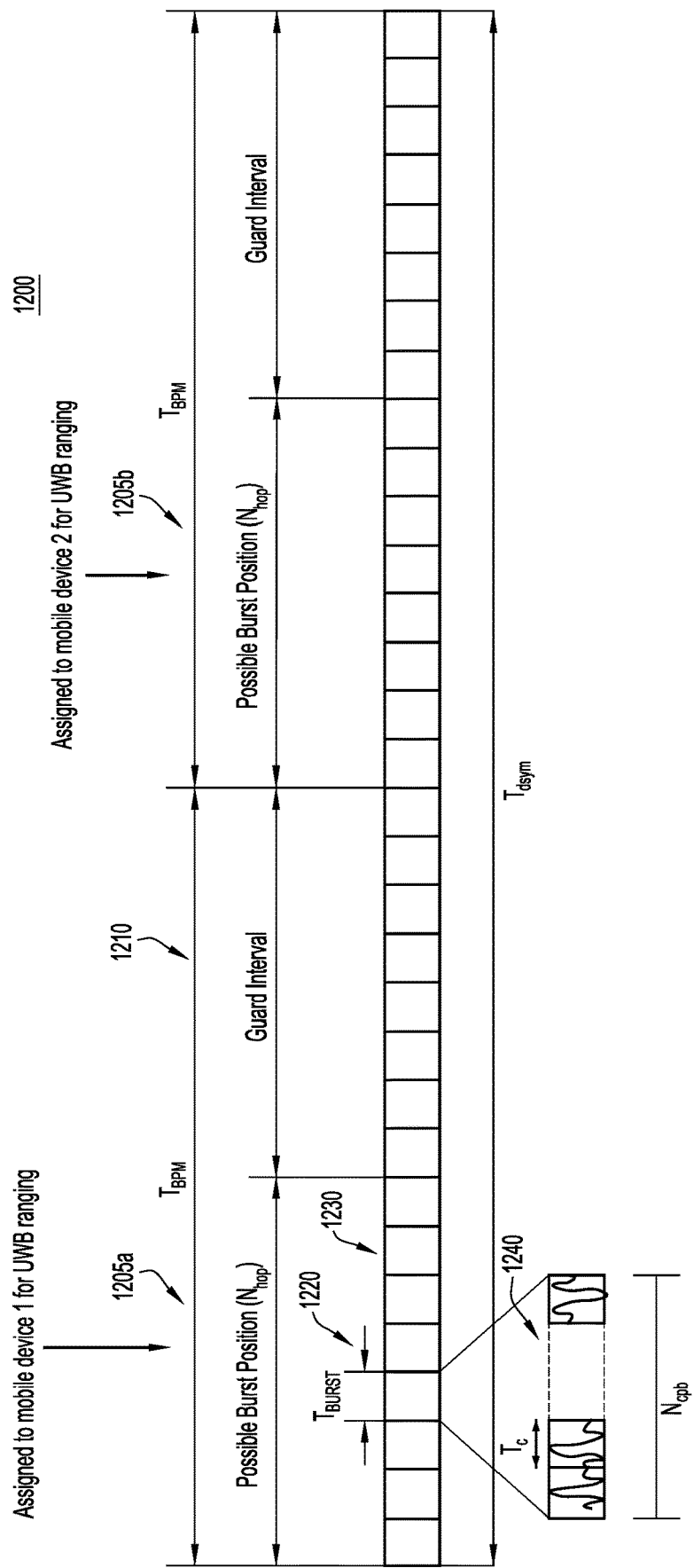
FIG. 12 is a diagram depicting how UWB ranging operations may be assigned, according to an example embodiment.

An example mechanism 1200 for allocating UWB slots to primary anchors is shown in FIG. 12. A first UWB slot 1205*a* is assigned to a first mobile device for UWB ranging, and a second UWB slot 1205*b* is assigned to a second mobile device for UWB ranging. The first UWB slot 1205*a* and the second UWB slot 1205*b* are separated by a guard interval 1210. Each of the UWB slots 1205*a* and 1205*b* includes at least one burst 1220. Each burst 1220 includes one or more burst positions 1230. Within each burst position 1230, there are different chip positions 1240.

A UWB signal sent during a burst position 1230 generally includes a short-lived pulse. Each pulse includes a relatively wide bandwidth signal (e.g., 499.2 MHz) that is relatively flat (e.g., with low power). Because the pulse is so short-lived and may not display consistent spectral intensity across the entire bandwidth, it may appear narrow in the frequency domain and in the time domain. Thus, two different mobile devices could be assigned the same burst position 1230, and their pulses may be: 1) displaying peak intensity on different subsets of the signal and, thus, detectable from each other, or 2) slightly misaligned in time and, thus, able to coexist without colliding. Accordingly, the location server can spread devices into different slots, at a narrower time resolution level, and the location server can assign devices to different burst positions in the same slot. For example, even if two devices are assigned the same burst position 1230, they may be assigned different chip positions 1240 and, therefore, avoid collisions.

Figure 13:
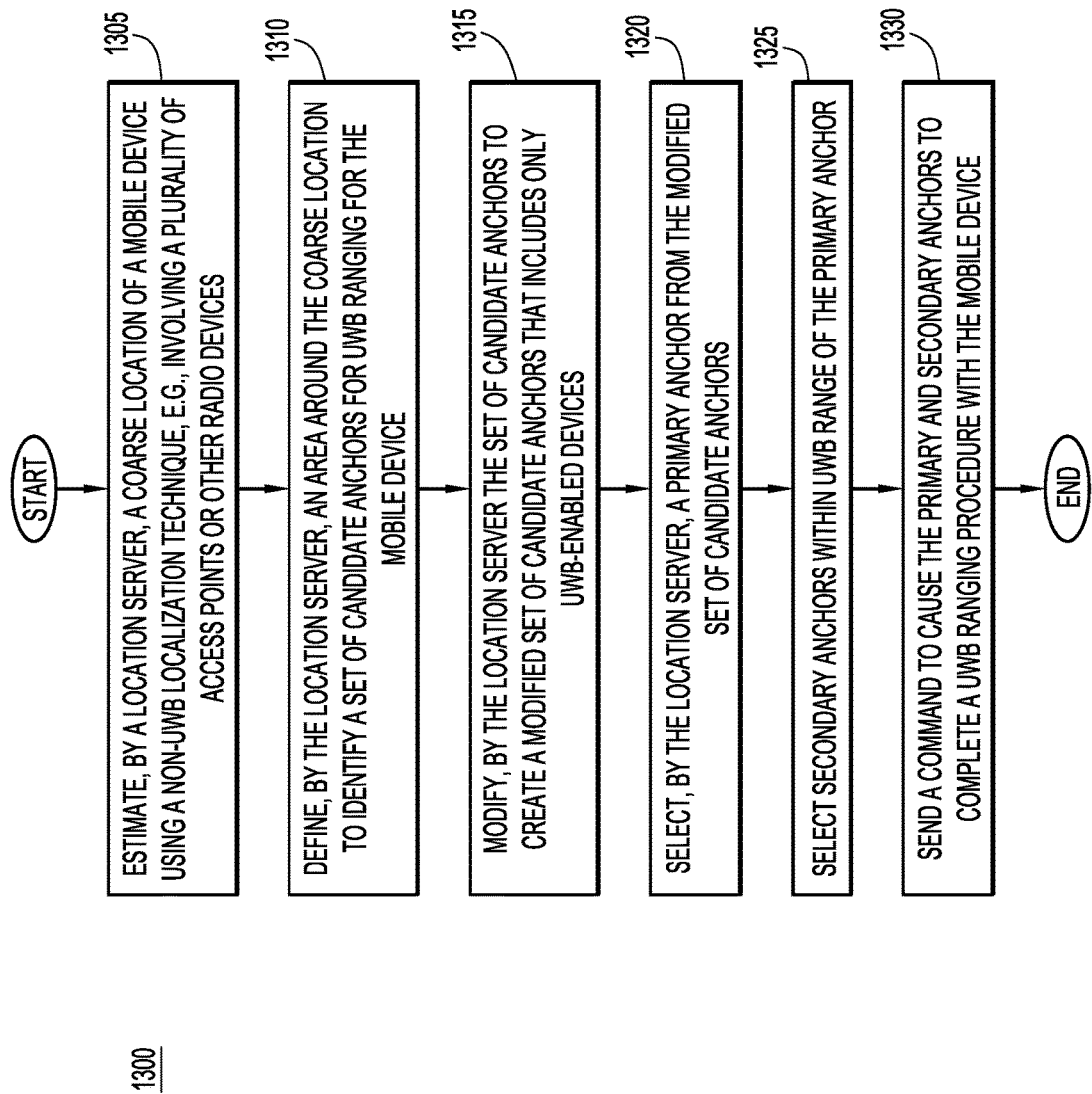
FIG. 13 is a flow chart depicting a method for assigning UWB anchors for client ranging, according to an example embodiment.

Turning now to FIG. 13, an example method 1300 is shown for assigning UWB anchors for client ranging, according to an example embodiment. In step 1305, a location server estimates a coarse location of a mobile device using a non-UWB localization technique, i.e., using a technique that does not involve UWB transmissions. For example, the location server can estimate the coarse location using lateration and/or an AoA technique. The localization technique may involve, e.g., Wi-Fi, BLE, or other non-UWB transmissions from/to one or more access points or other radio devices.

In step 1310, the location server defines an area around the coarse location to identify a set of candidate anchors for UWB ranging for the mobile device. For example, the location server can use a convex hull algorithm, such as a Slow Convex Hull or Graham's Scan, to define the area as a convex hull spanning all access points within RF range of one another within an envelope around the coarse location. The candidate anchors can include, e.g., at least a subset of the devices involved in determining the coarse location in step 1305.

In step 1315, the location server modifies the set of candidate anchors to create a modified set of candidate anchors that includes only UWB-enabled devices. For example, the location server can create the modified set of candidate anchors by removing from the set of candidate anchors any access points or other radio devices, which do not have UWB functionality, and adding to the set of candidate anchors any devices which are located within the area and have UWB functionality but were not involved in the coarse location determination. Operations that may be performed during step 1315 are described in more detail below with reference to FIG. 14.

In step 1320, the location server selects a primary anchor from the modified set of candidate anchors. For example, the location server can select the primary anchor by creating a plurality of coherent subgroups of the candidate anchors that are within a UWB range of one another and then selecting a primary anchor based on one or more characteristics of the subgroups. Operations that may be performed during step 1320 are described in more detail below with reference to FIG. 15.

In step 1325, the location server selects secondary anchors within UWB range of the primary anchor. For example, the location server can select one or more (or all) secondary anchors from the subgroup corresponding to the selected primary anchor. The location server may, for example, select a number of secondary anchors so that a total number of anchors participating in UWB ranging with the mobile device is below a predetermined maximum (e.g., six or less total anchors). For example, the location server can select only a closest x number of anchors to the mobile device to include as secondary anchors. In addition, or in the alternative, the location server may select as secondary anchors any anchors disposed along a perimeter of the area defined in step 1310.

In step 1330, the location server causes a command to be sent (either by the location server or a controller or other device cooperating with the location server) to cause the selected anchors to complete a UWB ranging procedure with the mobile device. The primary anchor can communicate with the mobile device to complete a location exchange, while the secondary anchors around can operate as "receive-only anchors," which passively receive UWB transmissions from the mobile device and the primary anchor but do not send communications to the mobile device. The secondary anchors may, for example, report the UWB transmissions, and/or information (times of arrival, etc.) based on the received UWB transmissions, to the location server for processing.

For example, the location server can send (or cooperate with a controller or other device, which sends) a signal to the primary anchor to invoke a mode in which the primary anchor sends to the mobile device a "nudge" message that suggests that the mobile device range with the primary anchor. In addition, or in the alternative, the location server can engage a hybrid mode in which the mobile device is sent a unicast message notifying the mobile device about its primary anchor. The mobile device can then send a "nudge" message that any device can detect, but with a destination address corresponding only to the primary anchor so that only the primary anchor responds. In another embodiment, the mobile device may use a broadcast or multicast address, with only the primary anchor answering back to the mobile device, and the secondary anchors not responding to the message.

Figure 14:
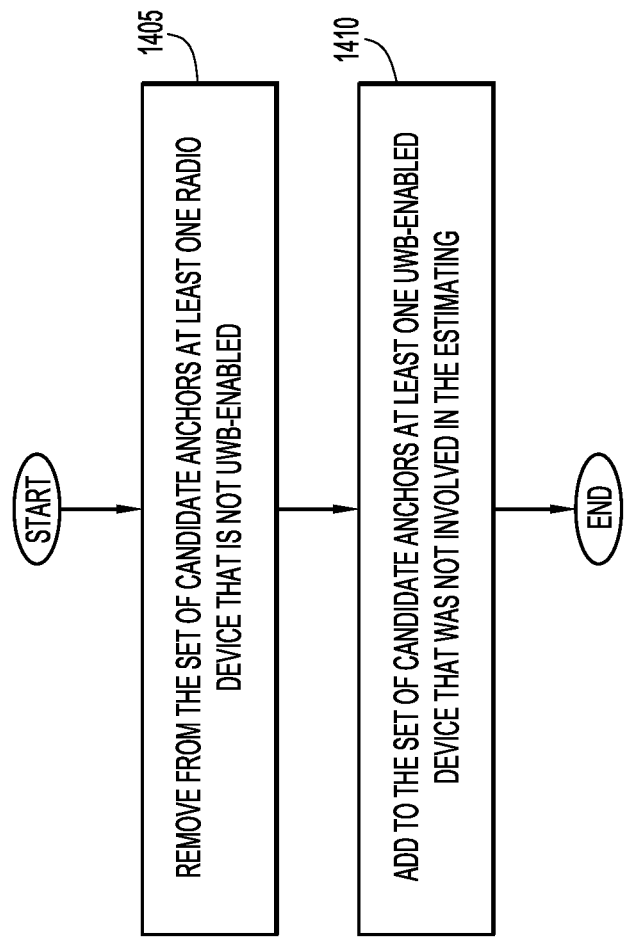
FIG. 14 is a flow chart depicting a method for creating a modified set of candidate anchors for client ranging, according to an example embodiment.

FIG. 14 is a flow chart depicting in more detail operations that may be performed at step 1315 for creating a modified set of candidate anchors for client ranging, according to an example embodiment. The operations of step 1315 continue from step 1310 of the method 1300 described above. In step 1405, the location server removes from the set of candidate anchors at least one access point or other radio device that is not UWB enabled. For example, the radio device may include Wi-Fi, BLE, or another communication technology, but not UWB functionality. That other communication technology may have been used, e.g., in the estimation of the coarse location in step 1305 of the method 1300.

In step 1410, the location server adds to the set of candidate anchors at least one UWB-enabled device that was not involved in the estimation of the coarse location in step 1305. For example, the UWB anchor devices may not have been involved in the coarse location determination because they are standalone UWB anchor devices and not integrated with, or attached to, an access point or other radio device, and/or because they do not include a type of functionality that was involved in the coarse location determination. Each of the one or more UWB-enabled devices that are added to the set of candidate anchors may, for example, be disposed within the area that was defined in step 1310. Processing continues to step 1320 in FIG. 13.

Figure 15:
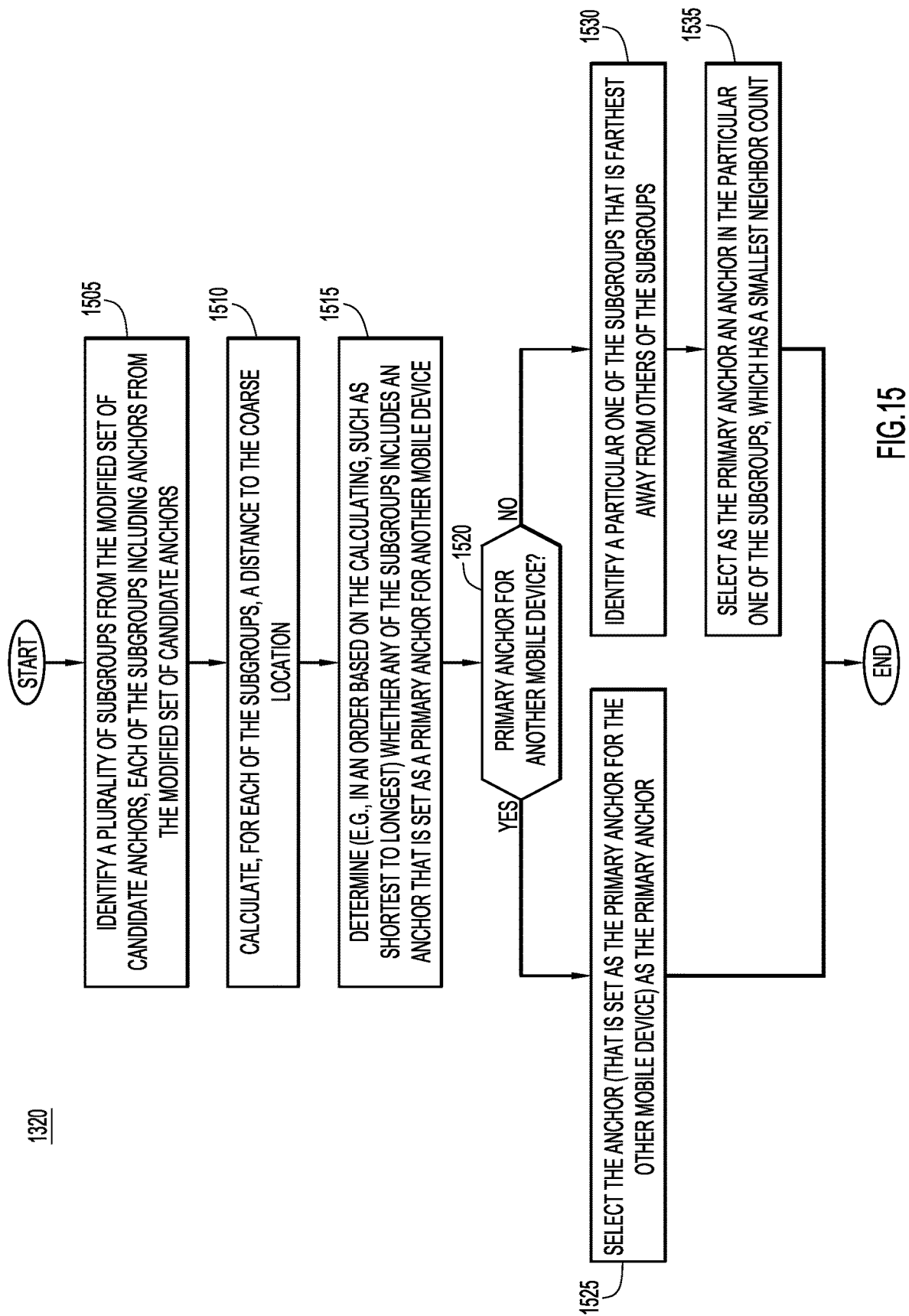
FIG. 15 is a flow chart depicting a method for selecting a primary UWB anchor for client ranging, according to an example embodiment.

FIG. 15 is a flow chart depicting operations that may be performed in step 1320 for selecting a primary UWB anchor for client ranging, according to an example embodiment. The operations of step 1320 continue from step 1315 of the method 1300 described above. In step 1505, the location server identifies a plurality of subgroups from the modified set of candidate anchors (that was created in step 1315). Each of the subgroups includes anchors from the modified set of candidate anchors. For example, the location server can identify subgroups that each include a subset of the candidate anchors that are all in UWB range of one another.

In step 1510, the location server calculates, for each of the subgroups, a distance to the coarse location. For example, the location server can calculate a distance to a center of the coarse location using one or more location estimation using noisy measurements techniques, such as a mean-square technique, 3-sphere technique, and/or direct Kalman technique. In step 1515, the location server determines, e.g., in an order based on the calculating, whether any of the subgroups includes an anchor that is set as a primary anchor for another mobile device. For example, the location server can use a mean-square reduction computation to sort the subgroups by relative distance to the center of the coarse location and then determine, in order of shortest to longest, whether each of the subgroups includes an anchor that is set as a primary anchor for another mobile device.

If, at 1520, the location server determines that one of the subgroups includes an anchor that is set as a primary anchor for another mobile device, then the process continues to step 1525. In step 1525, the location server selects the anchor that is set as the primary anchor for the other mobile device as the primary anchor. If the location server determines in step 1515 that none of the subgroups includes an anchor that is set as a primary anchor for another mobile device, then processing continues to step 1530 where the location server identifies a particular one of the subgroups that is farthest away from others of the subgroups. In step 1535, the location server selects as the primary anchor an anchor in the one of the subgroups, which has a smallest neighbor count. Thus, the location server can minimize a chance of collisions between the selected subgroup/anchor and any other group of anchors formed for UWB ranging with another mobile device. Processing then continues to step 1325 shown in FIG. 13.

As would be recognized by a person of skill in the art, the steps associated with the methods of the present disclosure, including method 1300, the operations of step 1315, and the operations of step 1320, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 16:
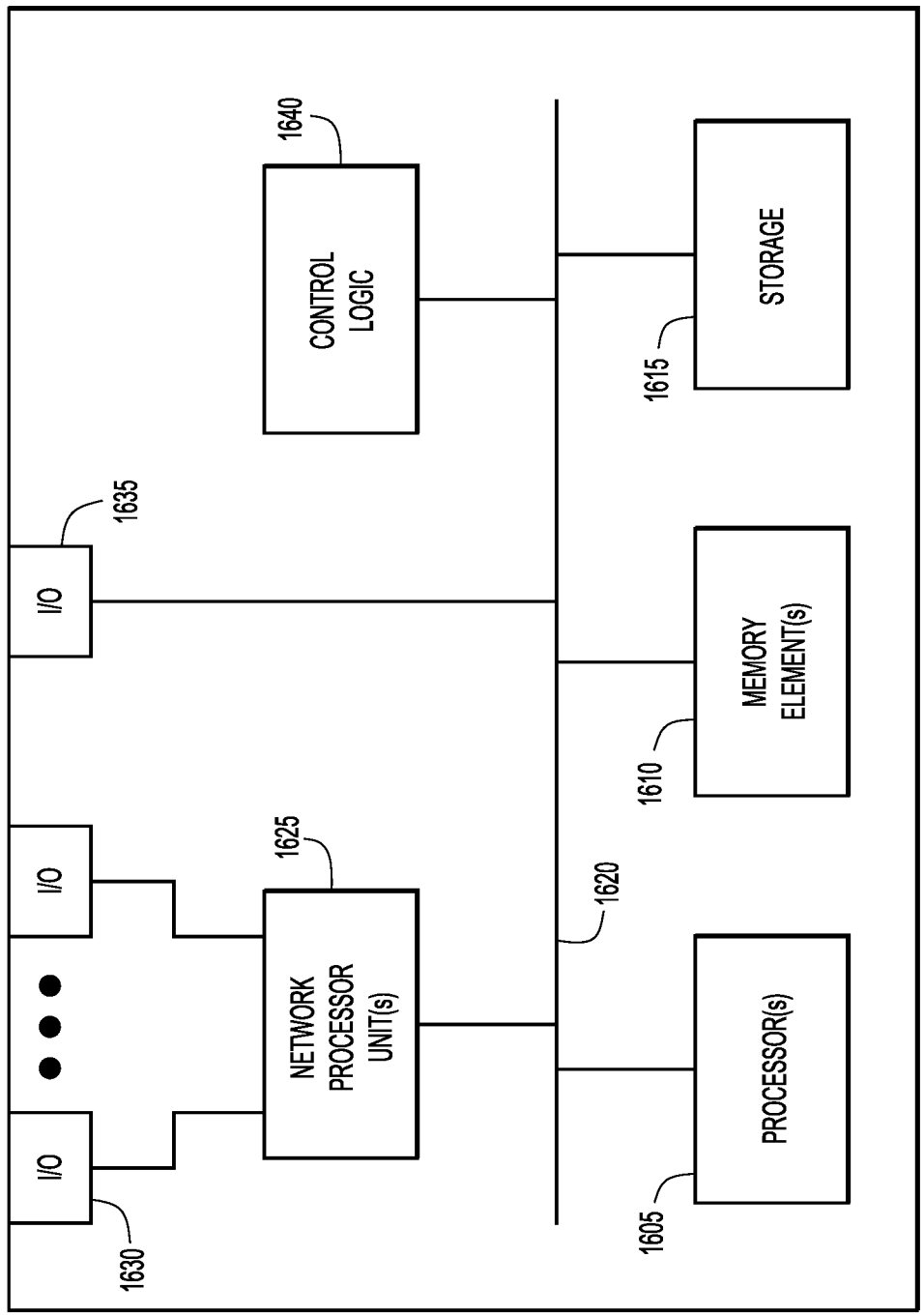
FIG. 16 is a block diagram of a computing device configured to perform functions associated with the techniques described herein, according to an example embodiment.

Referring to FIG. 16, FIG. 16 illustrates a hardware block diagram of a computing device 1600 that may perform functions associated with operations discussed herein in connection with the techniques depicted in FIGS. 1-15. In various embodiments, a computing device, such as computing device 1600 or any combination of computing devices 1600, may be configured as any entity/entities as discussed for the techniques depicted in connection with FIG. 16, such as controller 185 or location server 190 shown in FIG. 1 or location server 590 shown in FIGS. 5-11, in order to perform operations of the various techniques discussed herein.

In at least one embodiment, the computing device 1600 may include one or more processor(s) 1605, one or more memory element(s) 1610, storage 1615, a bus 1620, one or more network processor unit(s) 1625 interconnected with one or more network input/output (I/O) interface(s) 1630, one or more I/O interface(s) 1635, and control logic 1640. In various embodiments, instructions associated with logic for computing device 1600 can overlap in any manner and are not limited to the specific allocation of instructions and/or operations described herein.

In at least one embodiment, processor(s) 1605 is/are at least one hardware processor configured to execute various tasks, operations and/or functions for computing device 1600 as described herein according to software and/or instructions configured for computing device 1600. Processor(s) 1605 (e.g., a hardware processor) can execute any type of instructions associated with data to achieve the operations detailed herein. In one example, processor(s) 1605 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1610 and/or storage 1615 is/are configured to store data, information, software, and/or instructions associated with computing device 1600, and/or logic configured for memory element(s) 1610 and/or storage 1615. For example, any logic described herein (e.g., control logic 1640) can, in various embodiments, be stored for computing device 1600 using any combination of memory element(s) 1610 and/or storage 1615. Note that in some embodiments, storage 1615 can be consolidated with memory element(s) 1610 (or vice versa), or can overlap/exist in any other suitable manner.

In at least one embodiment, bus 1620 can be configured as an interface that enables one or more elements of computing device 1600 to communicate in order to exchange information and/or data. Bus 1620 can be implemented with any architecture designed for passing control, data and/or information between processors, memory elements/storage, peripheral devices, and/or any other hardware and/or software components that may be configured for computing device 1600. In at least one embodiment, bus 1620 may be implemented as a fast kernel-hosted interconnect, potentially using shared memory between processes (e.g., logic), which can enable efficient communication paths between the processes.

In various embodiments, network processor unit(s) 1625 may enable communication between computing device 1600 and other systems, entities, etc., via network I/O interface(s) 1630 to facilitate operations discussed for various embodiments described herein. In various embodiments, network processor unit(s) 1625 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1600 and other systems, entities, etc. to facilitate operations for various embodiments described herein. In various embodiments, network I/O interface(s) 1630 can be configured as one or more Ethernet port(s), Fibre Channel ports, and/or any other I/O port(s) now known or hereafter developed. Thus, the network processor unit(s) 1625 and/or network I/O interface(s) 1630 may include suitable interfaces for receiving, transmitting, and/or otherwise communicating data and/or information in a network environment.

I/O interface(s) 1635 allow for input and output of data and/or information with other entities that may be connected to computer device 1600. For example, I/O interface(s) 1635 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1640 can include instructions that, when executed, cause processor(s) 1605 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 1640) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), ASIC, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1610 and/or storage 1615 can store data, software, code, instructions (e.g., processor instructions), logic, parameters, combinations thereof, and/or the like used for operations described herein. This includes memory element(s) 1610 and/or storage 1615 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method can include estimating, by a location server, a coarse location of a mobile device using a localization technique other than a UWB localization technique. For example, the estimating may be performed in response to the mobile device entering a venue where the area is located. The localization technique can involve, e.g., a plurality of radio devices. The location server can define an area around the coarse location to identify a set of candidate anchors for UWB ranging for the mobile device. For example, the location server can define the area around the coarse location using a convex hull algorithm.

The set of candidate anchors can, e.g., be disposed within the area and comprise at least a subset of the plurality of radio devices. The location server can modify the set of candidate anchors to create a modified set of candidate anchors that includes only UWB-enabled devices. For example, the location server can create the modified set of candidate anchors by removing from the set of candidate anchors at least one radio device within the subset of the plurality of radio devices that is not UWB-enabled. In addition, or in the alternative, the location server can add to the set of candidate anchors at least one UWB-enabled device that was not involved in the estimating.

The location server can select a primary anchor from the modified set of candidate anchors. For example, selecting can include identifying a plurality of subgroups from the modified set of candidate anchors, each of the plurality of subgroups comprising a plurality of anchors from the modified set of candidate anchors, which are within a UWB range of one another; and selecting the primary anchor from a particular one of the plurality of subgroups based on a characteristic of the particular one of the plurality of subgroups. Selecting the primary anchor from the particular one of the plurality of subgroups can include, e.g., determining whether any of the plurality of subgroups includes an anchor that is set as a primary anchor for another mobile device; and in response to determining that one of the plurality of subgroups includes a particular anchor that is set as a primary anchor for another mobile device, selecting the particular anchor as the primary anchor.

For example, the location server can calculate, for each of the plurality of subgroups, a distance to a center of the coarse location and complete the determining (re: whether any of the plurality of subgroups includes an anchor that is set as a primary anchor for another mobile device) in an order based on the calculating. In response to determining that none of the plurality of subgroups includes an anchor that is set as a primary anchor for another mobile device, the location server can, e.g., identify a one of the plurality of subgroups that is farthest away from others of the plurality of subgroups; and select as the primary anchor an anchor in the one of the plurality of subgroups, which anchor has a smallest neighbor count. A command can be sent from the location server to the primary anchor to instruct the primary anchor to initiate a UWB ranging procedure with the mobile device.

In another form, an apparatus can include an interface configured to enable network communications, and one or more processors coupled to the interface. The one or more processors can be configured to perform operations including: estimating a coarse location of a mobile device using a localization technique other than an ultra-wide band (UWB) localization technique, the localization technique involving a plurality of radio devices; defining an area around the coarse location to identify a set of candidate anchors for UWB ranging for the mobile device, the set of candidate anchors being disposed within the area and comprising at least a subset of the plurality of radio devices; modifying the set of candidate anchors to create a modified set of candidate anchors that includes only UWB-enabled devices; selecting a primary anchor from the modified set of candidate anchors; and sending a command to cause a UWB ranging procedure to be initiated between the primary anchor and the mobile device.

In another form, one or more non-transitory computer readable storage media can include instructions that, when executed by at least one processor, are operable to: estimate a coarse location of a mobile device using a localization technique other than an ultra-wide band (UWB) localization technique, the localization technique involving a plurality of radio devices; define an area around the coarse location to identify a set of candidate anchors for UWB ranging for the mobile device, the set of candidate anchors being disposed within the area and comprising at least a subset of the plurality of radio devices; modify the set of candidate anchors to create a modified set of candidate anchors that includes only UWB-enabled devices; select a primary anchor from the modified set of candidate anchors; and send a command to cause a UWB ranging procedure to be initiated between the primary anchor and the mobile device.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi/Wi-Fi6@), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   estimating, by a location server, a coarse location of a mobile device using a localization technique other than an ultra-wide band (UWB) localization technique, the localization technique involving a plurality of radio devices;
   defining, by the location server, an area around the coarse location to identify a set of candidate anchors for UWB ranging for the mobile device, the set of candidate anchors being disposed within the area and comprising at least a subset of the plurality of radio devices;
   modifying, by the location server, the set of candidate anchors to create a modified set of candidate anchors that includes only UWB-enabled devices;
   selecting, by the location server, a primary anchor from the modified set of candidate anchors; and
   sending a command to cause a UWB ranging procedure to be initiated between the primary anchor and the mobile device.

2. The computer-implemented method of claim 1, wherein the defining comprises using a convex hull algorithm to define the area.

3. The computer-implemented method of claim 1, wherein the modifying comprises removing from the set of candidate anchors at least one radio device within the subset of the plurality of radio devices that is not UWB-enabled.

4. The computer-implemented method of claim 1, wherein the modifying comprises adding to the set of candidate anchors at least one UWB-enabled device that was not involved in the estimating.

5. The computer-implemented method of claim 1, wherein the selecting comprises:
   identifying a plurality of subgroups from the modified set of candidate anchors, each of the plurality of subgroups comprising a plurality of anchors from the modified set of candidate anchors, which are within a UWB range of one another; and
   selecting the primary anchor from a particular one of the plurality of subgroups based on a characteristic of the particular one of the plurality of subgroups.

6. The computer-implemented method of claim 5, wherein the selecting the primary anchor from the particular one of the plurality of subgroups comprises:
   determining whether any of the plurality of subgroups includes an anchor that is set as a primary anchor for another mobile device; and
   in response to determining that one of the plurality of subgroups includes a particular anchor that is set as a primary anchor for another mobile device, selecting the particular anchor as the primary anchor.

7. The computer-implemented method of claim 6, further comprising:
   calculating, for each of the plurality of subgroups, a distance to a center of the coarse location,
   wherein the determining is completed in an order based on the calculating.

8. The computer-implemented method of claim 6, further comprising:
   in response to determining that none of the plurality of subgroups includes an anchor that is set as a primary anchor for another mobile device:
   identifying a one of the plurality of subgroups that is farthest away from others of the plurality of subgroups; and selecting as the primary anchor an anchor in the one of the plurality of subgroups, which anchor has a smallest neighbor count.

9. The computer-implemented method of claim 1, wherein the estimating is performed in response to the mobile device entering a venue where the area is located.

10. An apparatus comprising:
an interface configured to enable network communications; and
one or more processors coupled to the interface and configured to perform operations including:
estimating a coarse location of a mobile device using a localization technique other than an ultra-wide band (UWB) localization technique, the localization technique involving a plurality of radio devices;
defining an area around the coarse location to identify a set of candidate anchors for UWB ranging for the mobile device, the set of candidate anchors being disposed within the area and comprising at least a subset of the plurality of radio devices;
modifying the set of candidate anchors to create a modified set of candidate anchors that includes only UWB-enabled devices;
selecting a primary anchor from the modified set of candidate anchors; and
sending a command to cause a UWB ranging procedure to be initiated between the primary anchor and the mobile device.

11. The apparatus of claim 10, wherein the one or more processors are further configured to define the area using a convex hull algorithm.

12. The apparatus of claim 10, wherein the one or more processors are further configured to modify the set of candidate anchors to create the modified set of candidate anchors by removing from the set of candidate anchors at least one radio device within the subset of the plurality of radio devices that is not UWB-enabled.

13. The apparatus of claim 10, wherein the one or more processors are further configured to modify the set of candidate anchors to create the modified set of candidate anchors by adding to the set of candidate anchors at least one UWB-enabled device that was not involved in the estimating.

14. The apparatus of claim 10, wherein the one or more processors are further configured to select the primary anchor from the modified set of candidate anchors by:
identifying a plurality of subgroups from the modified set of candidate anchors, each of the plurality of subgroups comprising a plurality of anchors from the modified set of candidate anchors, which are within a UWB range of one another; and
selecting the primary anchor from a particular one of the plurality of subgroups based on a characteristic of the particular one of the plurality of subgroups.

15. The apparatus of claim 14, wherein the one or more processors are further configured to select the primary anchor from the particular one of the plurality of subgroups by:

determining whether any of the plurality of subgroups includes an anchor that is set as a primary anchor for another mobile device; and
in response to determining that one of the plurality of subgroups includes a particular anchor that is set as a primary anchor for another mobile device, selecting the particular anchor as the primary anchor.

16. One or more non-transitory computer readable storage media comprising instructions that, when executed by at least one processor, are configured to:
estimate a coarse location of a mobile device using a localization technique other than an ultra-wide band (UWB) localization technique, the localization technique involving a plurality of radio devices;
define an area around the coarse location to identify a set of candidate anchors for UWB ranging for the mobile device, the set of candidate anchors being disposed within the area and comprising at least a subset of the plurality of radio devices;
modify the set of candidate anchors to create a modified set of candidate anchors that includes only UWB-enabled devices;
select a primary anchor from the modified set of candidate anchors; and
send a command to cause a UWB ranging procedure to be initiated between the primary anchor and the mobile device.

17. The one or more non-transitory computer readable storage media of claim 16, wherein the instructions further cause the processor to define the area using a convex hull algorithm.

18. The one or more non-transitory computer readable storage media of claim 16, wherein the instructions further cause the processor to modify the set of candidate anchors to create the modified set of candidate anchors by removing from the set of candidate anchors at least one radio device within the subset of the plurality of radio devices that is not UWB-enabled.

19. The one or more non-transitory computer readable storage media of claim 16, wherein the instructions further cause the processor to modify the set of candidate anchors to create the modified set of candidate anchors by adding to the set of candidate anchors at least one UWB-enabled device that was not involved in the estimating.

20. The one or more non-transitory computer readable storage media of claim 16, wherein the instructions further cause the processor to select the primary anchor from the modified set of candidate anchors by:
identifying a plurality of subgroups from the modified set of candidate anchors, each of the plurality of subgroups comprising a plurality of anchors from the modified set of candidate anchors, which are within a UWB range of one another; and
selecting the primary anchor from a particular one of the plurality of subgroups based on a characteristic of the particular one of the plurality of subgroups.

* * * * *